(12) United States Patent
Abe et al.

(10) Patent No.: US 12,189,098 B2
(45) Date of Patent: Jan. 7, 2025

(54) ZOOM LENS AND IMAGE PICKUP APPARATUS

(71) Applicant: CANON KABUSHIKI KAISHA, Tokyo (JP)

(72) Inventors: Hirofumi Abe, Tochigi (JP); Kazuki Someya, Aichi (JP); Kenta Sudo, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 521 days.

(21) Appl. No.: 17/547,276

(22) Filed: Dec. 10, 2021

(65) Prior Publication Data

US 2022/0244496 A1 Aug. 4, 2022

(30) Foreign Application Priority Data

Feb. 3, 2021 (JP) .................. 2021-016051

(51) Int. Cl.
*G02B 13/00* (2006.01)
*G02B 9/62* (2006.01)
*G02B 13/02* (2006.01)
*G03B 5/02* (2021.01)

(52) U.S. Cl.
CPC ............. *G02B 13/009* (2013.01); *G02B 9/62* (2013.01); *G02B 13/0045* (2013.01); *G02B 13/02* (2013.01); *G03B 5/02* (2013.01)

(58) Field of Classification Search
CPC .... G02B 13/009; G02B 9/62; G02B 13/0045; G02B 13/02; G02B 15/144113; G02B 15/145121; G02B 15/1461; G03B 5/02
See application file for complete search history.

(56) References Cited

U.S. PATENT DOCUMENTS

| 5,136,430 | A | * | 8/1992 | Hamanishi | ......... G02B 15/1461 |
| | | | | | 359/713 |
| 9,116,330 | B2 | | 8/2015 | Abe | |
| 9,250,426 | B2 | | 2/2016 | Abe | |
| 9,651,762 | B2 | | 5/2017 | Abe | |
| 9,715,090 | B2 | | 7/2017 | Abe | |
| 9,952,446 | B2 | | 4/2018 | Abe | |
| 10,061,114 | B2 | | 8/2018 | Sudo | |

(Continued)

FOREIGN PATENT DOCUMENTS

| CN | 102087404 A | 6/2011 |
| CN | 208026988 U | * 10/2018 |

(Continued)

OTHER PUBLICATIONS

Notice of Reasons for Refusal issued by the Japanese Patent Office on Sep. 3, 2024 in corresponding JP Patent Application No. 2021-016051, with English translation.

*Primary Examiner* — Mustak Choudhury
*Assistant Examiner* — K Muhammad
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, and a subsequent unit. The first lens unit is configured not to move for zooming. A distance between each pair of adjacent lens units changes in zooming. A predetermined condition is satisfied.

12 Claims, 13 Drawing Sheets

(56) References Cited

U.S. PATENT DOCUMENTS

| | | |
|---|---|---|
| 10,197,778 B2 | 2/2019 | Sudo et al. |
| 10,545,335 B2 | 1/2020 | Sudo |
| 10,983,336 B2 | 4/2021 | Abe et al. |
| 11,009,677 B2 | 5/2021 | Abe |
| 11,061,203 B2 | 7/2021 | Abe et al. |
| 2013/0301142 A1 | 11/2013 | Cheng |
| 2018/0292627 A1* | 10/2018 | Takemoto ...... G02B 15/145121 |
| 2020/0271906 A1* | 8/2020 | Kimura .................. G02B 15/20 |
| 2020/0348495 A1 | 11/2020 | Sudo |
| 2021/0132345 A1* | 5/2021 | Nishioka ............ G02B 15/1461 |
| 2021/0199937 A1 | 7/2021 | Sudo et al. |
| 2021/0278644 A1* | 9/2021 | Koga ............. G02B 15/145121 |

FOREIGN PATENT DOCUMENTS

| | | |
|---|---|---|
| JP | S62-027712 A | 2/1987 |
| JP | 2016-114355 A | 6/2016 |
| JP | 2016-118737 A | 6/2016 |
| JP | 2019028175 A * | 2/2019 |
| JP | 2019-184968 A | 10/2019 |

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

Some image pickup apparatuses, such as surveillance cameras, network cameras, and video cameras, tend to use more pixels with a wider pixel pitch of an image sensor (image pickup element), that is, a larger image sensor. On the other hand, a zoom lens used in such an image pickup apparatus is required to be smaller and lighter.

Japanese Patent Laid-Open No. ("JP") 2016-118737 discloses a zoom lens that includes, in order from an object side to an image side, first to fifth lens units having positive, negative, positive, negative, and positive refractive powers, moves the second, third, and fourth lens units during zooming, and has a zoom ratio of about 5 times. JP 62-027712 discloses a zoom lens that includes, in order from the object side to the image side, first to fourth lens units having positive, negative, negative, and positive refractive powers, moves the second and third lens units during zooming, and has a magnification ratio of about 2 times.

The zoom lens disclosed in JP 2016-118737 has a relatively high magnification ratio, but can be large to deal with the increased size of the image sensor while ensuring the optical performance. The zoom lens disclosed in JP 62-027712 is relatively small and lightweight, but its optical performance is not sufficient for the increased number of pixels in the image sensor.

SUMMARY OF THE DISCLOSURE

An aspect of the disclosure provides, for example, a zoom lens beneficial in a small size and a high optical performance over an entire zoom range thereof.

A zoom lens according to one aspect of the present invention includes, in order from an object side to an image side, a first lens unit having a positive refractive power, a second lens unit having a negative refractive power, and a subsequent unit. The first lens unit is configured not to move for zooming. A distance between each pair of adjacent lens units changes in zooming. The following conditions are satisfied:

$$0.68 \leq f1/ft \leq 1.20$$

$$0.27 \leq TDt/ft \leq 0.90$$

where f1 is a focal length of the first lens unit, ft is a focal length of the zoom lens at a telephoto end, and TDt is a length on an optical axis of the zoom lens from a surface closest to the object side to a surface closest to the image side at the telephoto end.

Further features of the present invention will become apparent from the following description of exemplary embodiments with reference to the attached drawings.

DESCRIPTION OF THE EMBODIMENTS

Figure 1:
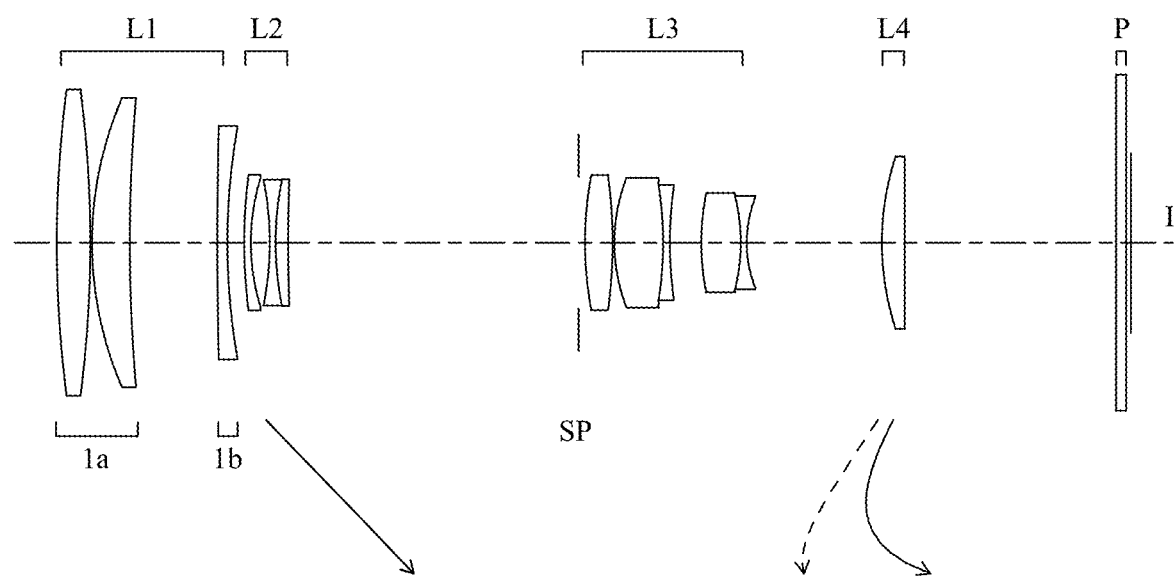
FIG. 1 is a sectional view of a zoom lens according to Example 1.

Referring now to the accompanying drawings, a description will be given of embodiments according to the present invention.

Prior to the description of specific Examples 1 to 6 to be described later, matters common to each example will be described. FIGS. 1, 4, 7, 10, 13, and 16 illustrate sections of zoom lenses according to Examples 1 to 6 at a wide-angle end, respectively. The zoom lens according to each example is used for an imaging optical system in an image pickup apparatus such as a digital video camera, a digital still camera, a broadcasting camera, a film-based camera, and a surveillance camera. In each figure, a left side is an object side and a right side is an image side. The zoom lens according to each example includes a plurality of lens units. The lens unit, as used herein, means a group of one or more lenses that move or stand still integrally during zooming (magnification variation). Each distance between adjacent lens units changes during zooming.

The zoom lenses according to each example includes, in order from an object side to an image side, a first lens unit L1 having a positive refractive power, a second lens unit L2 having a negative refractive power, and a subsequent unit (L3 to Ln) (n=4 to 6). During zooming from a wide-angle end to a telephoto end, the first lens unit L1 is fixed (immobile), and any of the other lens units moves so as to change a distance between adjacent lens units. The zoom lens according to each example satisfies both conditions expressed by the following inequalities (conditional expressions) (1) and (2):

$$0.68 \leq f1/ft \leq 1.20 \quad (1)$$

$$0.27 \leq TDt/ft \leq 0.90 \quad (2)$$

where f1 is a focal length of the first lens unit L1, ft is a focal length of the zoom lens at the telephoto end, and TDt is an overall optical length of the zoom lens at the telephoto end. Satisfying these conditions can realize a high optical performance over the entire zoom range with a compact size.

The overall optical length of the zoom lens is a length on the optical axis from a surface (frontmost surface) closest to the object to a surface closest to the image plane in the zoom lens. More specifically, a backfocus that is an air equivalent length on the optical axis from a final surface to the image plane is added to the overall lens length, which is a length on the optical axis from the frontmost surface to the (final) surface closest to the image plane. If there is an optical element such as a filter or a glass block in the backfocus, an air equivalent length increased by the optical element is also added to the backfocus.

The inequality (1) illustrates a condition relating to a relationship between the focal length of the first lens unit L1 and the focal length of the zoom lens at the telephoto end. If f1/ft is lower than the lower limit in the inequality (1), the refractive power of the first lens unit L1 becomes too strong, and it becomes difficult to correct the spherical aberration and coma over the entire zooming range. If f1/ft is higher than the upper limit in the inequality (1), the refractive power of the first lens unit L1 becomes too weak, causing the overall optical length to increase.

The inequality (2) illustrates a condition relating to a relationship between the overall optical length of the zoom lens and the focal length of the zoom lens at the telephoto end. If TDt/ft is higher than the upper limit in the inequality (2), the overall optical length becomes too long. If TDt/ft is lower than the lower limit in the inequality (2), the power of each lens unit in the zoom lens becomes excessively strong, and it becomes difficult to correct the spherical aberration and curvature of field in the entire zoom range.

In the zoom lens according to each example, the first lens unit L1 includes a first subunit 1a having a positive refractive power and disposed on the object side of the longest air spacing in the first lens unit, and a second subunit 1b having a negative refractive power and disposed on the image side of the air spacing. At least one of conditions expressed by the following inequalities may be satisfied:

$$1.20 \leq f1/f1a \leq 3.00 \quad (3)$$

$$0.90 \leq f1b/f2 \leq 6.50 \quad (4)$$

$$0.01 \leq D1/f1 \leq 0.60 \quad (5)$$

where f1a is a focal length of the first subunit 1a, f1b is a focal length of the second subunit 1b, and D1 is an overall length of the first lens unit (a length on the optical axis from the surface closest to the object to the surface closest to the image in the first lens unit L1), and f2 is a focal length of the second lens unit is f2.

The inequality (3) illustrates a condition relating to a relationship between the focal length of the first lens unit L1 and the focal length of the first subunit 1a. If f1/f1a is higher than the upper limit in the inequality (3), the refractive power of the first subunit 1a against the first lens unit L1 becomes too strong, and it becomes difficult to correct the chromatic aberration in the first lens unit L1. If f1/f1a is lower than the lower limit in the inequality (3), the refractive power of the first lens unit L1 becomes too strong, and it becomes difficult to correct the spherical aberration and coma over the entire zoom range.

The inequality (4) illustrates a condition relating to a relationship between the focal length of the second subunit 1b and the focal length L2 of the second lens unit. If f1 b/f2 is higher than the upper limit in the inequality (4), the refractive power of the second subunit f1b becomes too strong, and it becomes difficult to correct the chromatic aberration in the first lens unit L1. If f1b/f2 is lower than the lower limit in the inequality (4), the refractive power of the second lens unit L2 against the second subunit 1b becomes too strong, and the fluctuation of the spherical aberration and coma during zooming increases.

The inequality (5) illustrates a condition regarding a relationship between the overall length of the first lens unit L1 and the focal length of the first lens unit L1. If D1/f1 is higher than the upper limit in the inequality (5), the overall length of the first lens unit L1 becomes too long and the entire zoom lens system becomes large. If D1/f1 is lower than the lower limit in the inequality (5), the overall length of the first lens unit L1 becomes too short, the refractive powers of the lenses constituting the first lens unit L1 become stronger, and it becomes difficult to correct the spherical aberration.

The first lens unit L1 may include four lenses or less. The four lenses or less can restrain the first lens unit L1 and the entire zoom lens system from becoming larger.

In the first lens unit L1, a lens closest to the object may have a positive refractive power and a lens closest to the image plane may have a negative refractive power. Thereby, the principal point position of the first lens unit L1 is located on the object side, so that a smaller telephoto zoom lens can be realized.

The zoom lens according to each example may satisfy the condition expressed by the following inequality (6):

$$15.0 \leq v1nave \leq 60.0 \quad (6)$$

where v1nave is an average Abbe number of at least one negative lens in the first lens unit L1.

The inequality (6) illustrates a condition relating to an average Abbe number of the negative lenses in the first lens unit L1. If v1nave is higher than the upper limit in the inequality (6), it becomes difficult to correct the longitudinal chromatic aberration, in particular, at the telephoto end. If v1nave is lower than the lower limit in the inequality (6), it becomes difficult to correct the lateral chromatic aberration in the entire zoom range.

The subsequent unit may include at least one rear immovable unit that is fixed during zooming from the wide-angle end to the telephoto end, and at least one of the at least one rear immovable unit may include at least three lenses. The rear immovable unit including at least three lenses in which the principal ray of the off-axis light beam is relatively high can satisfactorily correct the aberration of the off-axis light beam, such as the coma and the curvature of field.

The lens unit on the image side of the second lens unit L2 may be moved during focusing. A lighter lens unit that is moved during focusing is suitable for a mechanism that drives this lens unit. A focal length may less change during focusing. The lens unit disposed on the image side of the second lens unit L2 is likely lightweight and has a small zooming effect, and thus is suitable for focusing.

The numerical range of the inequalities (1) to (6) may be set as follows:

$$0.69 \leq f1/ft \leq 1.07 \quad (1a)$$

$$0.50 \leq TDt/ft \leq 0.89 \quad (2a)$$

$$1.40 \leq f1/fla \leq 2.80 \quad (3a)$$

$$1.20 \leq f1b/f2 \leq 5.00 \quad (4a)$$

$$0.05 \leq D1/f1 \leq 0.45 \quad (5a)$$

$$20.0 \leq v1nave \leq 50.0 \quad (6a)$$

The numerical range of the inequalities (1a) to (6a) may be set as follows:

$$0.69 \leq f1/ft \leq 0.94 \quad (1b)$$

$$0.73 \leq TDt/ft \leq 0.88 \quad (2b)$$

$$1.60 \leq f1/fla \leq 2.60 \quad (3b)$$

$$1.50 \leq f1b/f2 \leq 4.35 \quad (4b)$$

$$0.09 \leq D1/f1 \leq 0.30 \quad (5b)$$

$$24.0 \leq v1nave \leq 41.0 \quad (6b)$$

Examples 1 to 6 will now be more specifically described.

Example 1

The zoom lens according to Example 1 illustrated in FIG. 1 includes, in order from the object side to the image side, a first lens unit L1 having a positive refractive power, a second lens unit L2 having a negative refractive power, and a subsequent unit that includes a third lens unit L3 having a positive refractive power, and a fourth lens unit L4 having a positive refractive power. As illustrated by arrows in FIG. 1, during zooming from the wide-angle end to the telephoto end, the first lens unit L1 is fixed and the second and fourth lens units L2 and L4 are moved and change a distance between adjacent lens units. The fourth lens unit L4 is moved so as to draw a locus indicated by a solid arrow and a dotted arrow in in-focus states on an infinity object and a short-distance object, respectively. The fourth lens unit L4 is moved during focusing.

SP denotes a diaphragm (aperture stop), and I denotes an image plane. Disposed on the image plane I is a light receiving plane of an image sensor (image pickup element), such as a CCD sensor and a CMOS sensor, or a photosensitive plane of a silver halide film. P denotes a glass block such as a low-pass filter and a face plate of an image sensor. These are similarly applied to other examples described later. In this example, the diaphragm SP is closest to the object in the third lens unit L3.

Figure 2A:
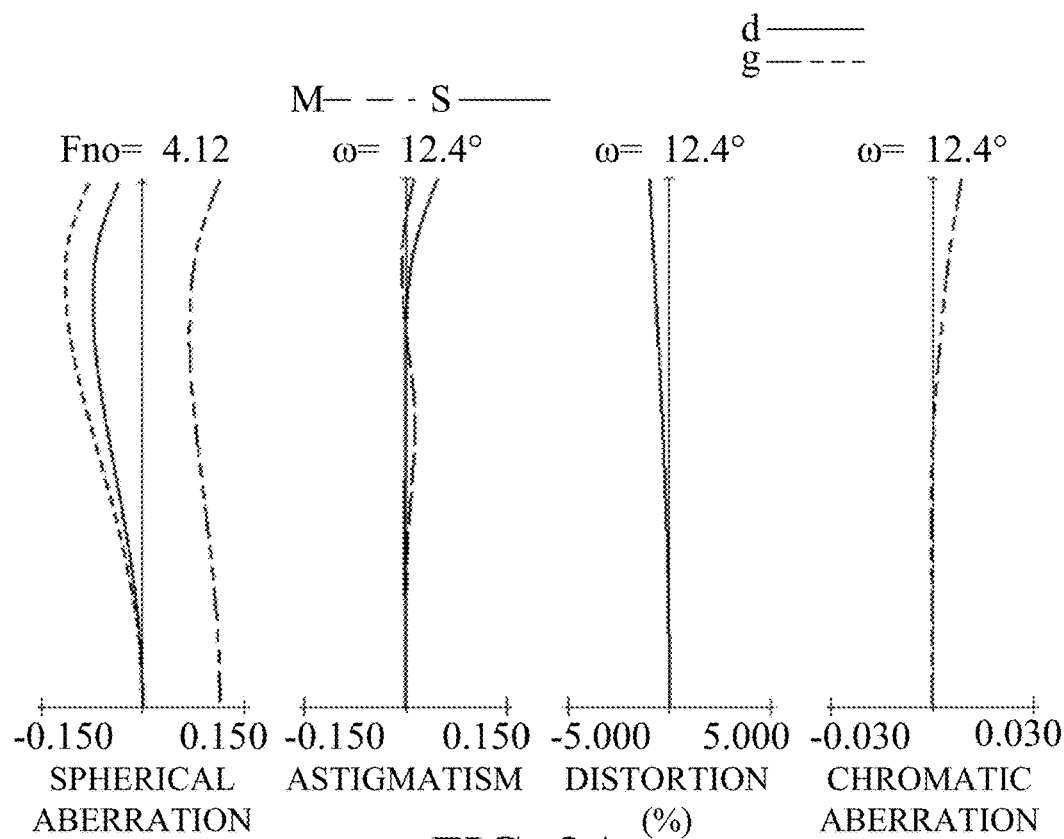
FIGS. 2A and 2B are aberration diagrams of the zoom lens at a wide-angle end and a middle zoom position in Example 1, respectively.
Figure 2B:
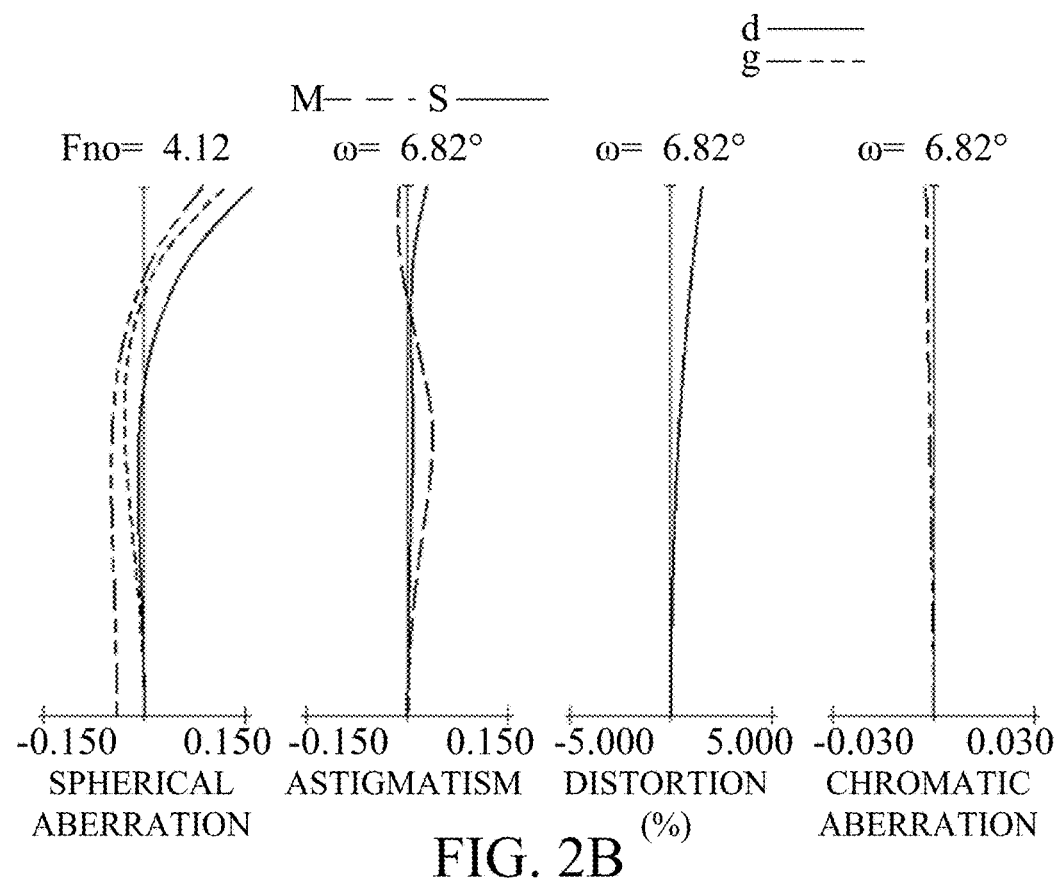
Figure 3:
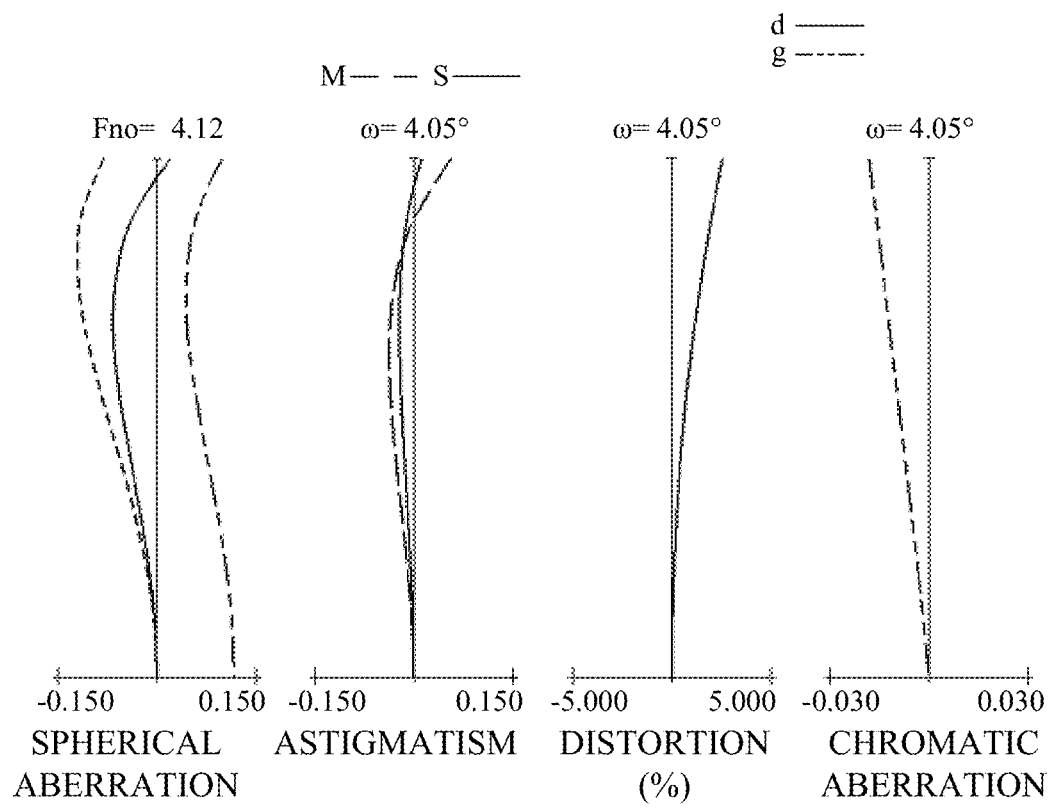
FIG. 3 is an aberration diagram at a telephoto end of the zoom lens according to Example 1.

Numerical example 1 illustrates more specific examples of various numerical values of the zoom lens according to Example 1. FIG. 2A is an aberration diagram of the zoom lens at the wide-angle end, FIG. 2B is an aberration diagram of the zoom lens at the middle zoom position, FIG. 3 is an aberration diagram of the zoom lens at the telephoto end in Example 1 (numerical example 1).

In numerical example 1, a surface number i denotes the order of a surface counted from the object side, r denotes a radius of curvature (mm) of an i-th surface, and d is a lens thickness or air spacing (mm) between the i-th surface and the (i+1)-th surface. nd are a refractive index of an optical material between the i-th surface and the (i+1)-th surface for the d-line. vd is an Abbe number based on the d-line of the optical material between the i-th surface and the (i+1)-th surface. The Abbe number vd of the material is expressed as follows:

$$vd=(Nd-1)/(NF-NC)$$

where Nd, NF, and NC are refractive indexes of the optical material for the d-line (587.6 nm), the F-line (486.1 nm), and the C-line (656.3 nm) in the Fraunhofer lines.

As described above, the overall optical length is a length on the optical axis from the surface (frontmost surface) closest to the object to the image plane in the zoom lens. More specifically, the backfocus, which is the air equivalent length on the optical axis from the final surface to the image plane, is added to the overall lens length, which is the length on the optical axis from the frontmost surface to the (final) surface closest to the image plane.

BF denotes a backfocus (mm). The "backfocus" is a distance on the optical axis from the final surface of the zoom lens (a surface on the image side of the lens closest to the image plane among the lenses having refractive powers) to the paraxial image plane and is converted into the air equivalent length.

In the spherical aberration diagram, Fno denotes an F-number, a solid line denotes a spherical aberration for the d-line (wavelength 587.6 nm), and an alternate long and two short dashes line denotes a spherical aberration for the g-line (wavelength 435.8 nm). In the astigmatism diagram, ω denotes a half angle of view (°), a solid line S indicates a sagittal image plane, and a broken line M indicates a meridional image plane. The distortion diagram is illustrated for the d-line. The chromatic aberration diagram illustrates a lateral chromatic aberration for the g-line. The description of the numerical example and the aberration diagram is similarly applied to other examples described later.

Table 1 summarizes the values of the above conditions (inequalities (1) to (6)) in Example 1 (numerical example 1). As understood from Table 1, the zoom lens according to numerical example 1 satisfies each condition.

Example 2

Figure 4:
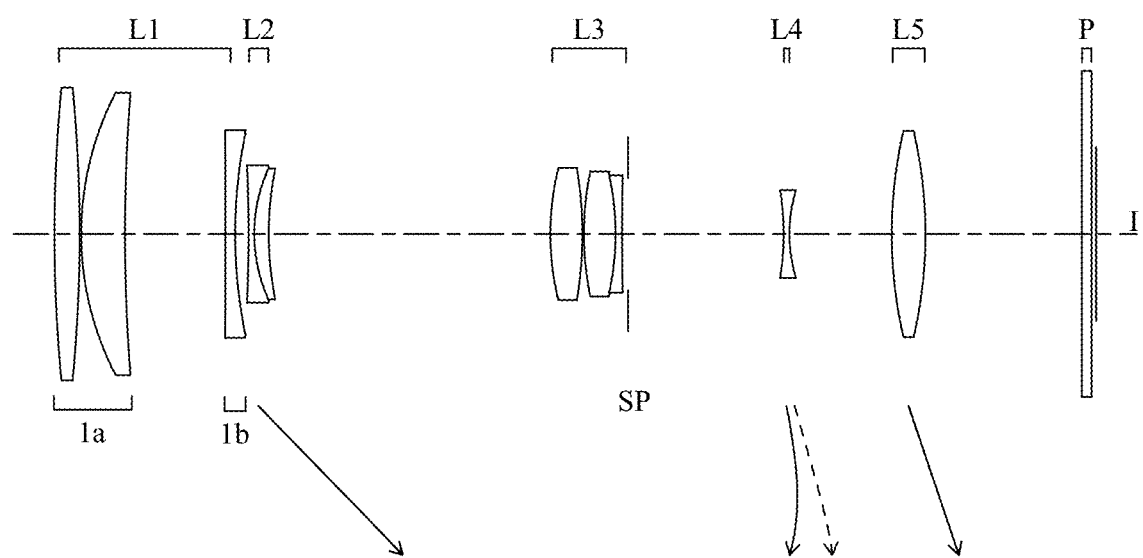
FIG. 4 is a sectional view of a zoom lens according to Example 2.

The zoom lenses according to Example 2 illustrated in FIG. 4 includes, in order from the object side to the image side, a first lens unit L1 having a positive refractive power, a second lens unit L2 having a negative refractive power, and a subsequent unit that includes a third lens unit L3 having a positive refractive power, a fourth lens unit L4 having a negative refractive power, and a fifth lens unit L5 having a positive refractive power. As illustrated by arrows in FIG. 4, during zooming from the wide-angle end to the telephoto end, the first lens unit L1 is fixed, and the second, fourth, and fifth lens units L2, L4, and L5 are moved and change a distance between adjacent lens units. The fourth lens unit L4 moves so as to draw a locus indicated by a solid arrow and a dotted arrow in in-focus states on an infinity object and a short-distance object, respectively. The fourth lens unit L4 is moved during focusing. The diaphragm SP is closest to the image plane in the third lens unit L3.

Figure 5A:
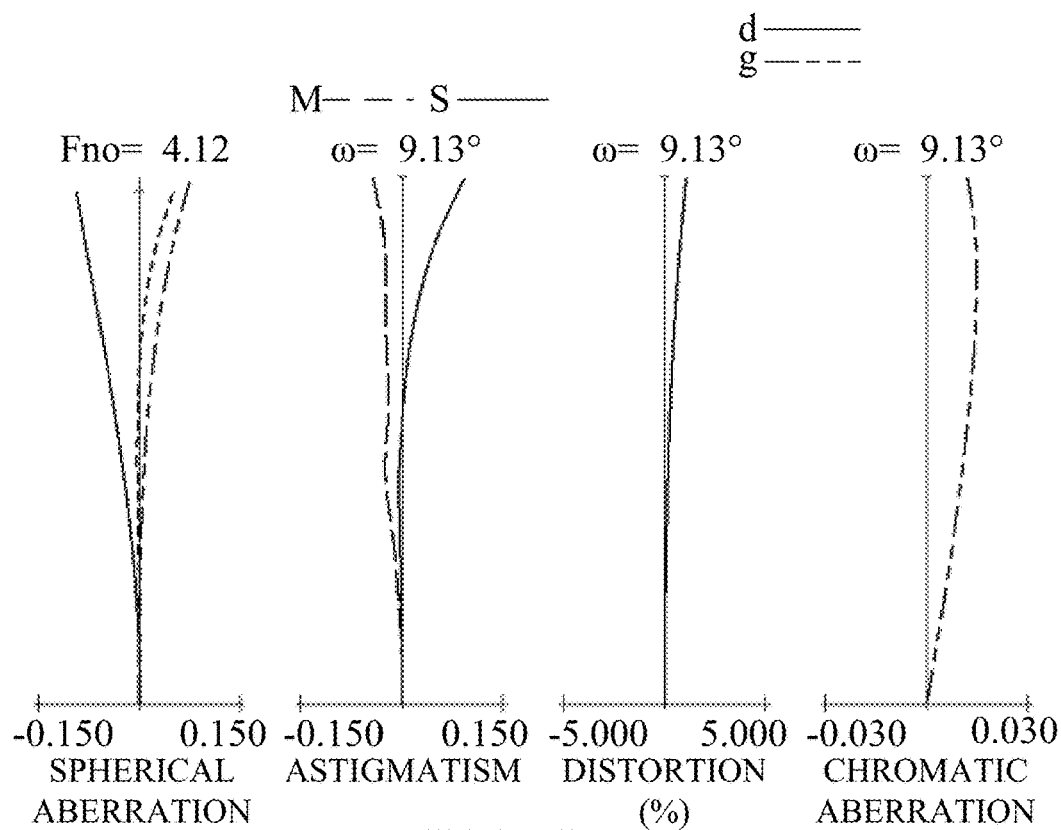
FIGS. 5A and 5B are aberration diagrams of the zoom lens at a wide-angle end and a middle zoom position in Example 2, respectively.
Figure 5B:
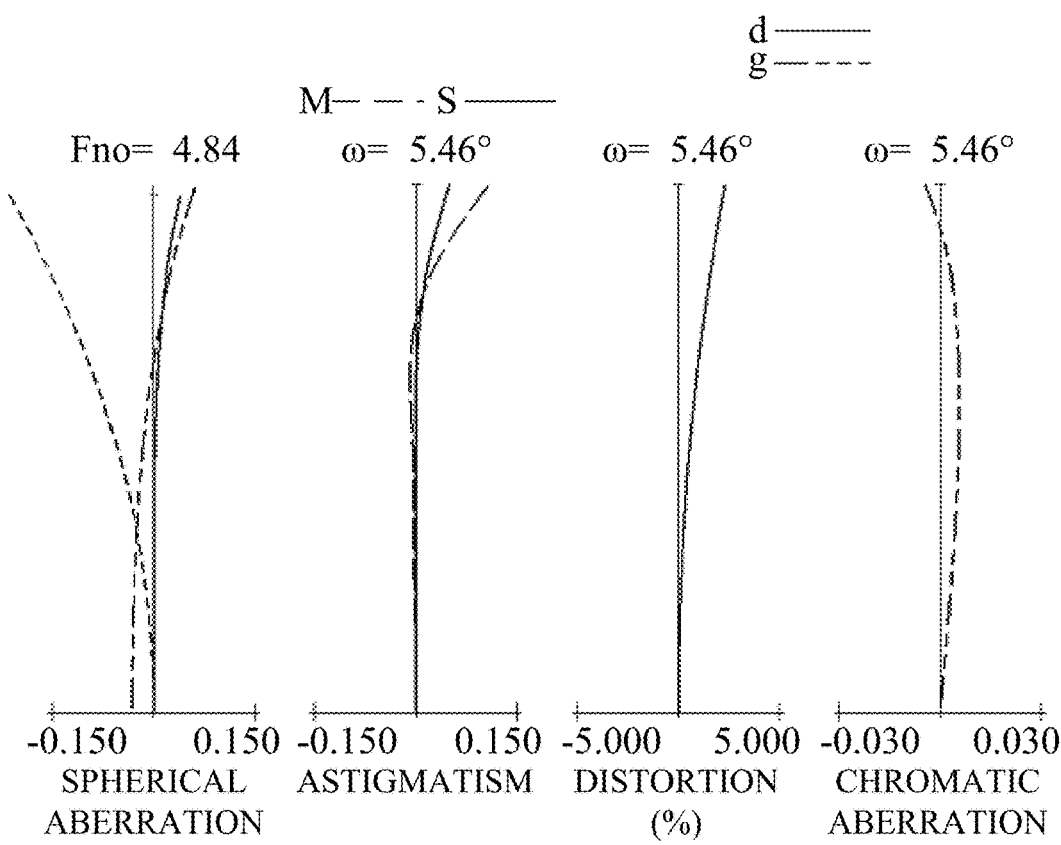
Figure 6:
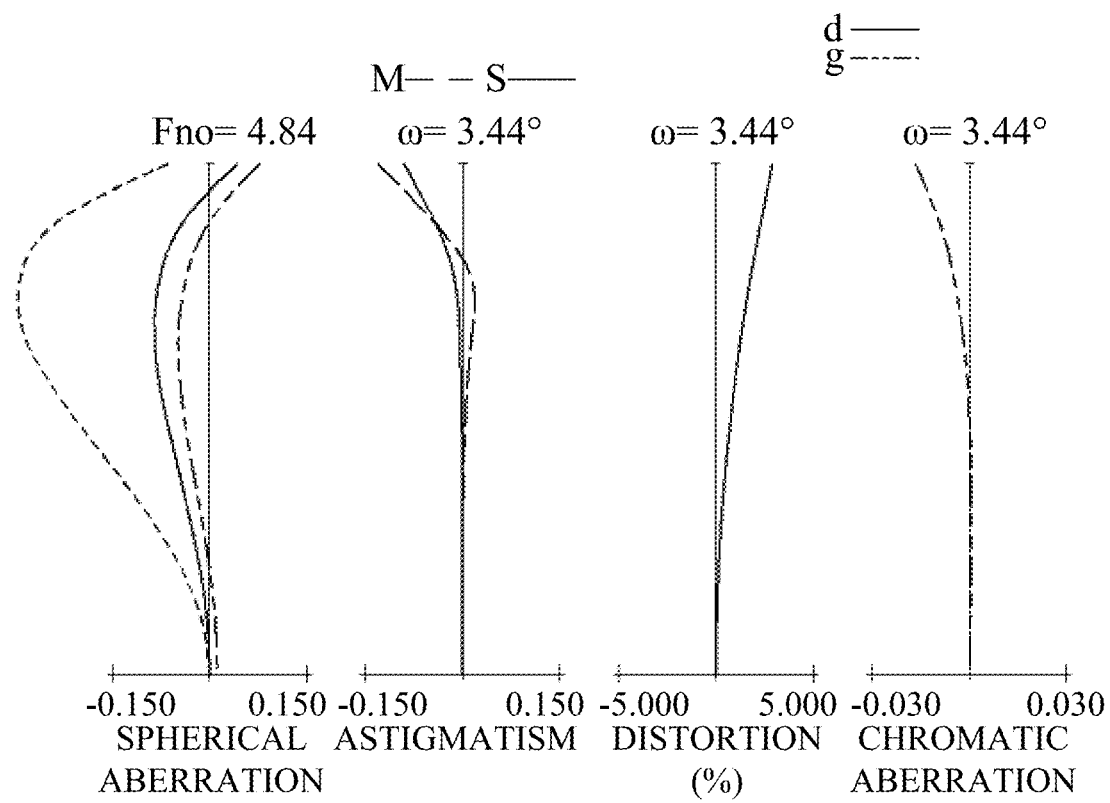
FIG. 6 is an aberration diagram at a telephoto end of the zoom lens according to Example 2.

Numerical example 2 illustrates more specific examples of various numerical values of the zoom lens according to Example 2. FIG. 5A is an aberration diagram of the zoom lens at the wide-angle end, FIG. 5B is an aberration diagram of the zoom lens at the middle zoom position, and FIG. 6 is an aberration diagram of the zoom lens at the telephoto end in Example 2 (numerical example 2).

Table 1 summarizes the values of the above conditions (inequalities (1) to (6)) in Example 2 (numerical example 2). As understood from Table 1, the zoom lens according to numerical example 2 satisfies each condition.

Example 3

Figure 7:
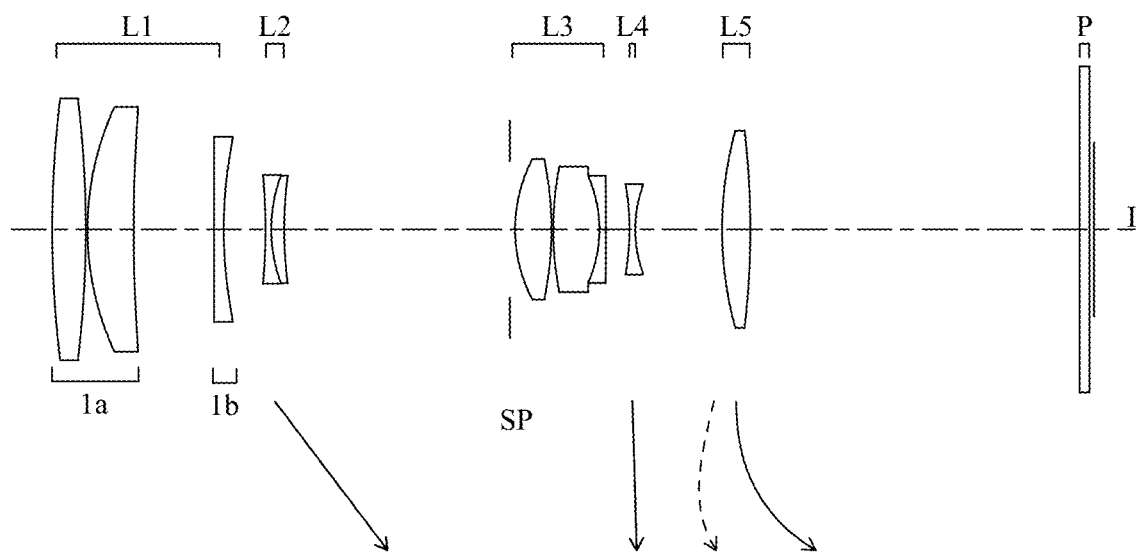
FIG. 7 is a sectional view of a zoom lens according to Example 3.

The zoom lenses according to Example 3 illustrated in FIG. 7 includes, in order from the object side to the image side, a first lens unit L1 having a positive refractive power, a second lens unit L2 having a negative refractive power, and a subsequent unit that includes a third lens unit L3 having a positive refractive power, a fourth lens unit L4 having a negative refractive power, and a fifth lens unit L5 having a positive refractive power. As illustrated by arrows in FIG. 7, during zooming from the wide-angle end to the telephoto end, the first lens unit L1 is fixed, and the second, fourth, and fifth lens units L2, L4 and L5 are moved and change a distance between adjacent lens units. The fifth lens unit L5 is moved so as to draw a locus indicated by a solid arrow and a dotted arrow in in-focus states on an infinity object and a short-distance object, respectively. The fifth lens unit L5 is moved during focusing. The diaphragm SP is closest to the object in the third lens unit L3.

Figure 8A:
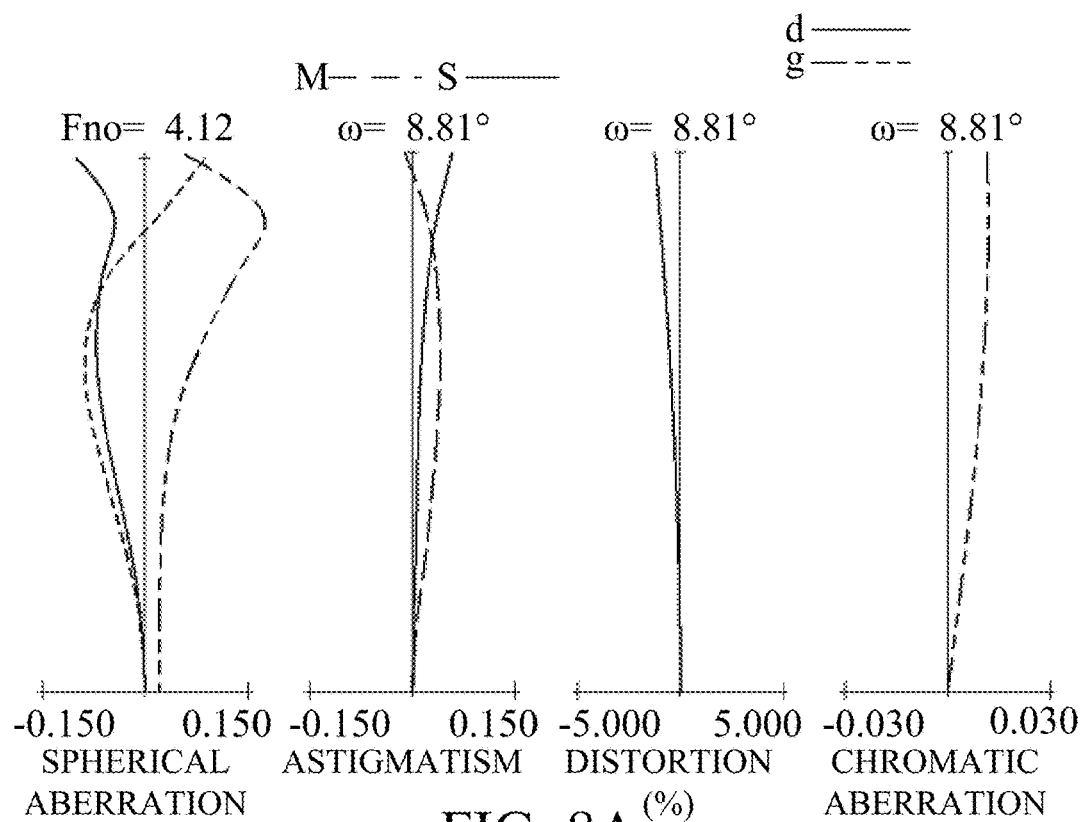
FIGS. 8A and 8B are aberration diagram of the zoom lens at a wide-angle end and a middle zoom position in Example 3, respectively.
Figure 8B:
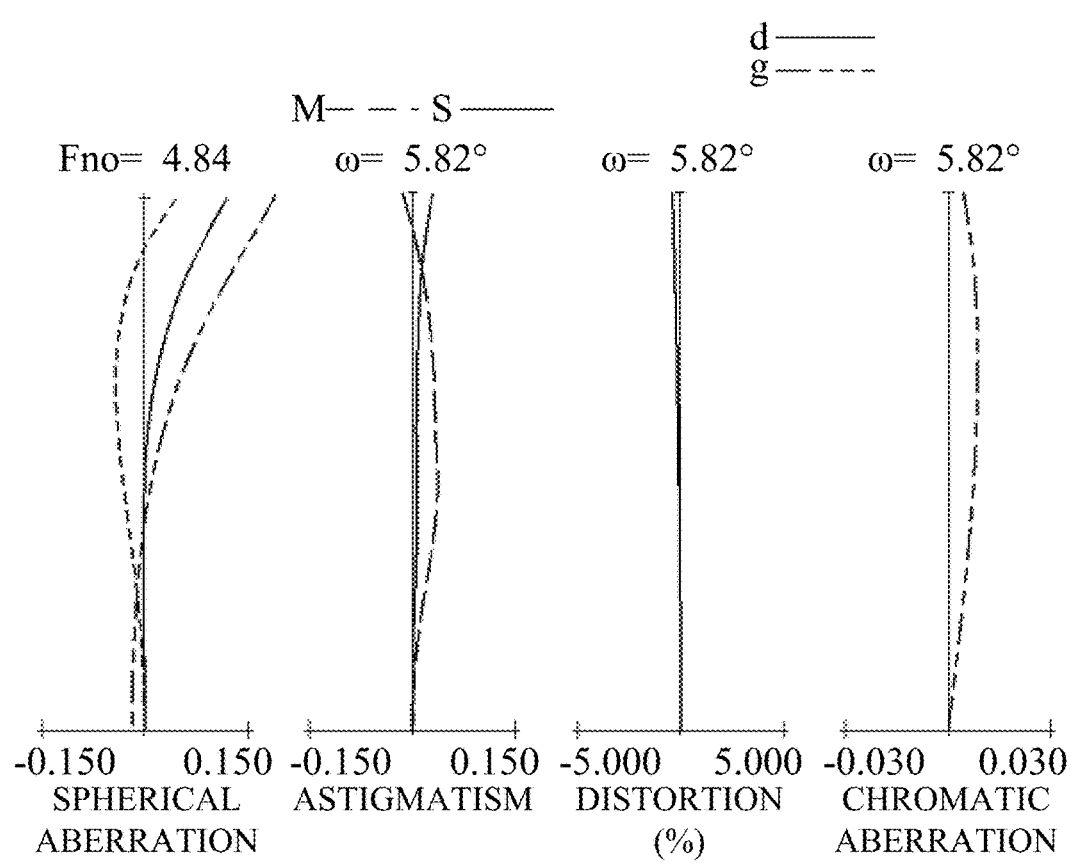
Figure 9:
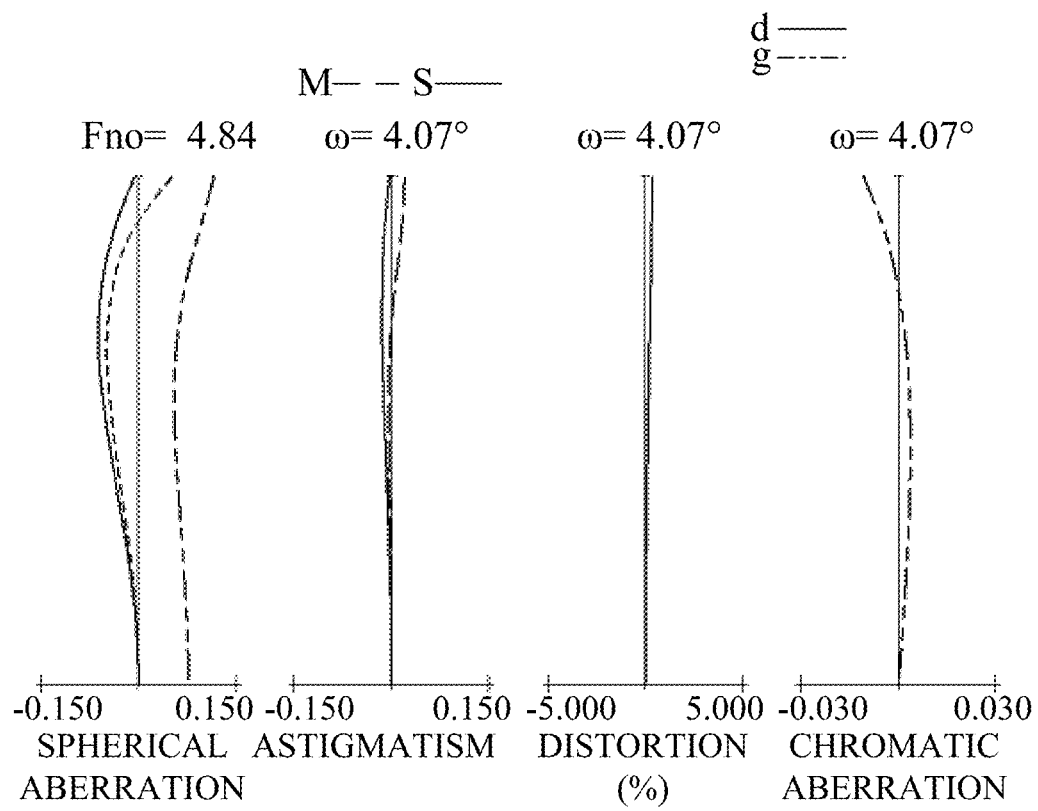
FIG. 9 is an aberration diagram at a telephoto end of the zoom lens according to Example 3.

Numerical example 3 illustrates more specific examples of various numerical values of the zoom lens according to Example 3. FIG. 8A is an aberration diagram of the zoom lens at the wide-angle end, FIG. 8B is an aberration diagram of the zoom lens at the middle zoom position, and FIG. 9 is an aberration diagram of the zoom lens at the telephoto end in Example 3 (numerical example 3).

Table 1 summarizes the values of the above conditions (inequalities (1) to (6)) in Example 3 (numerical example 3). As understood from Table 1, the zoom lens according to numerical example 3 satisfies each condition.

Example 4

Figure 10:
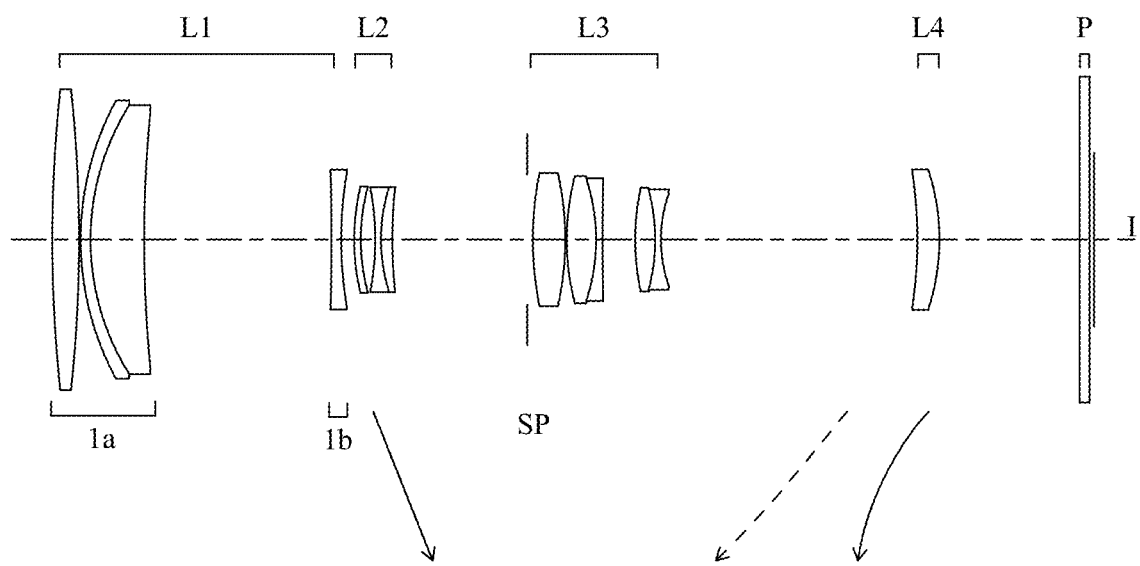
FIG. 10 is a sectional view of a zoom lens according to Example 4.

The zoom lenses according to Example 4 illustrated in FIG. 10 includes, in order from the object side to the image side, a first lens unit L1 having a positive refractive power, a second lens unit L2 having a negative refractive power, and a subsequent unit that includes a third lens unit L3 having a positive refractive power and a fourth lens unit L4 having a positive refractive power. As illustrated by arrows in FIG. 10, during zooming from the wide-angle end to the telephoto end, the first lens unit L1 is fixed, and the second and fourth lens units L2 and L4 are moved and change a distance between adjacent lens units. The fourth lens unit L4 is moved so as to draw a locus indicated by a solid arrow and a dotted arrow in in-focus states on an infinity object and a short-distance object, respectively. The fourth lens unit L4 is moved during focusing. The diaphragm SP is closest to the object in the third lens unit L3.

Figure 11A:
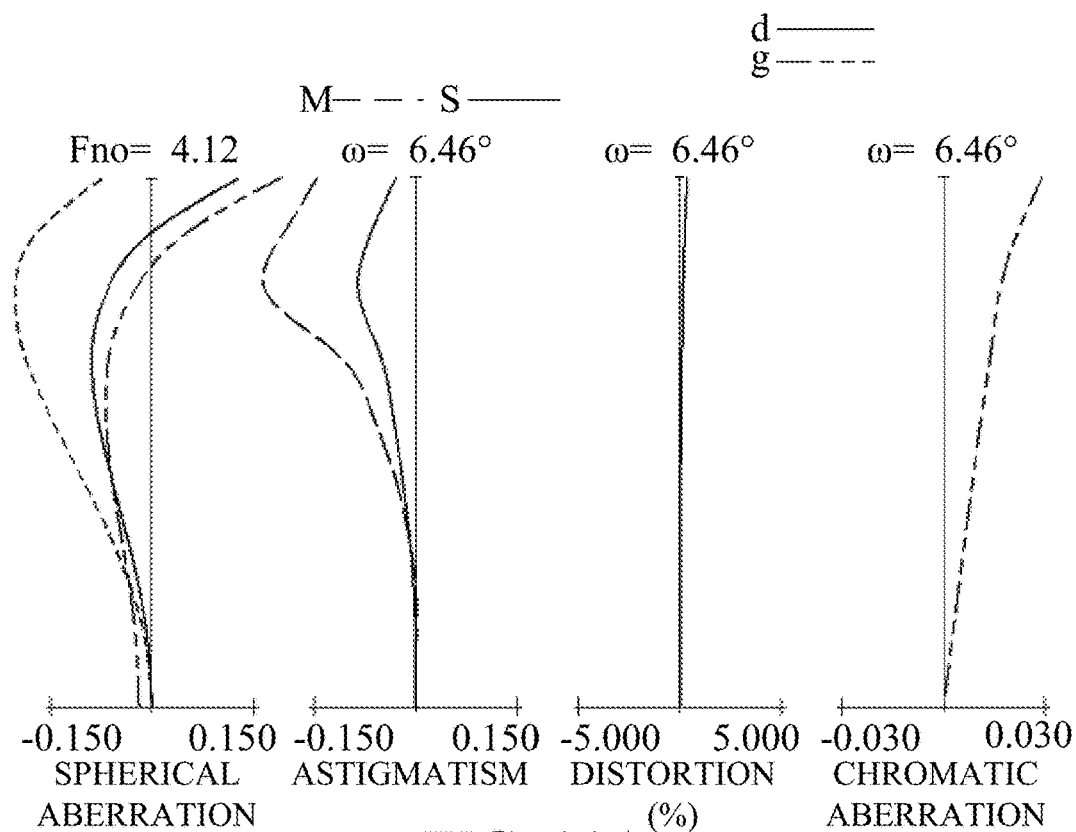
FIGS. 11A and 11B are aberration diagrams of the zoom lens at a wide-angle end and a middle zoom position in Example 4, respectively.
Figure 11B:
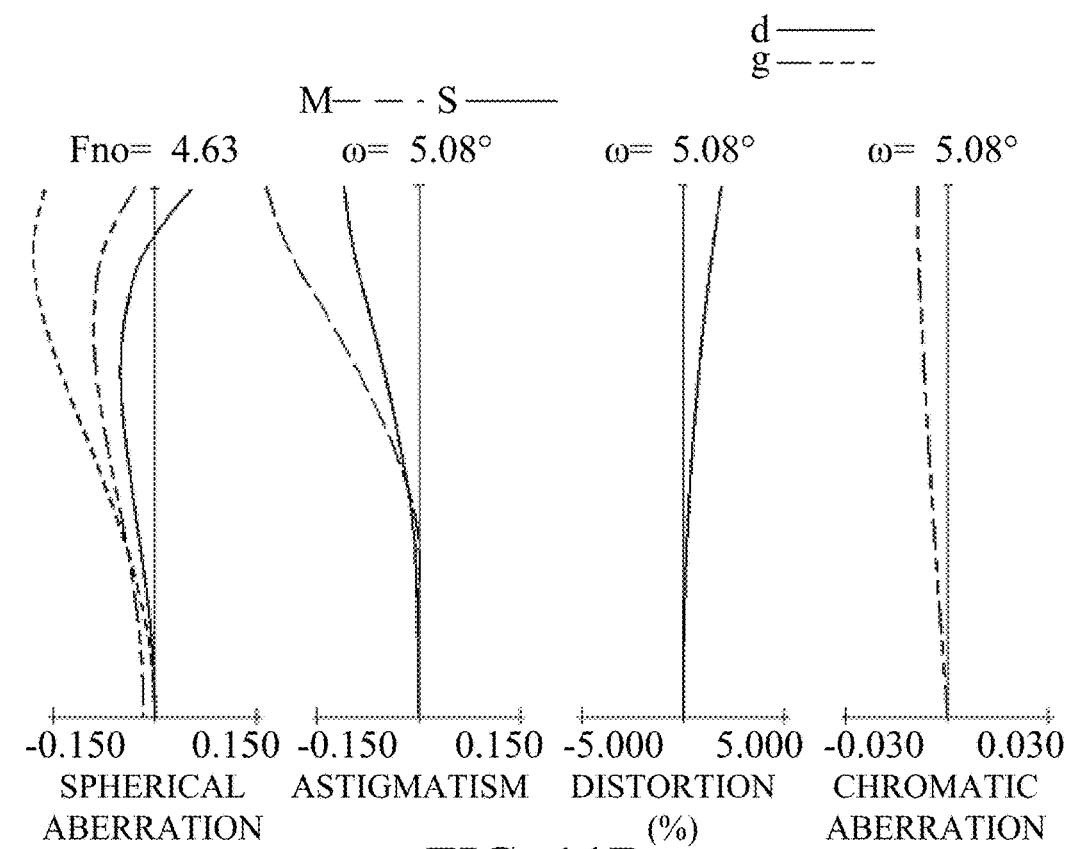
Figure 12:
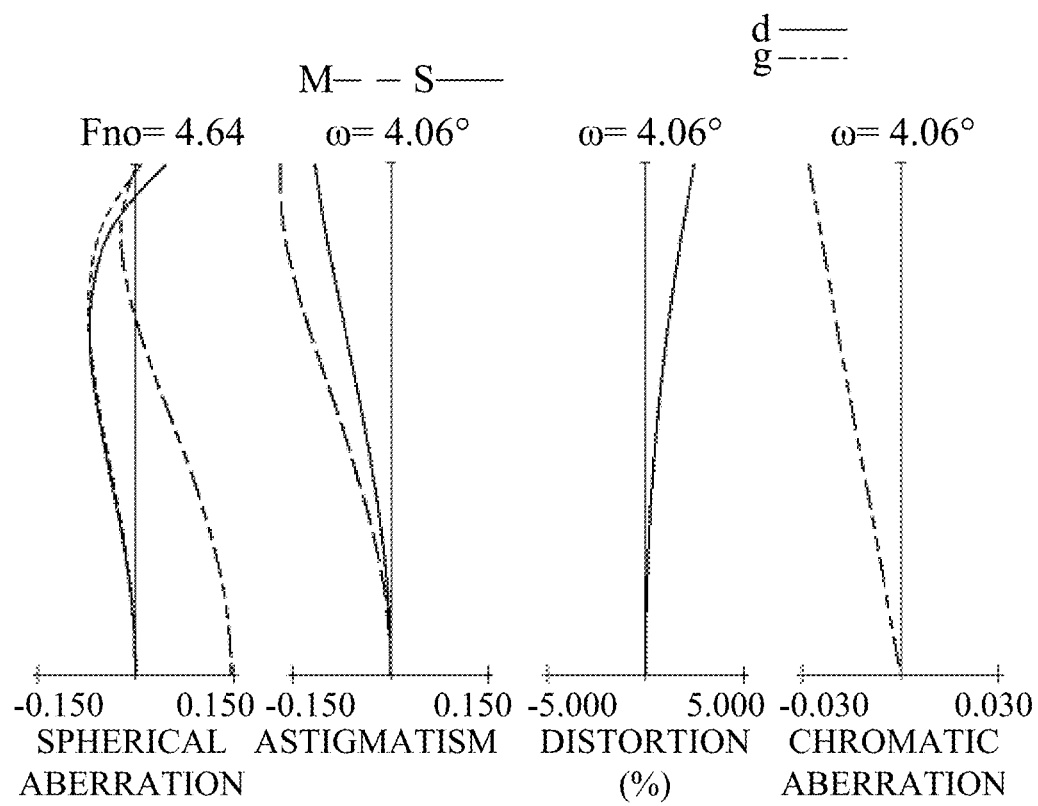
FIG. 12 is an aberration diagram at a telephoto end of the zoom lens according to Example 4.

Numerical example 4 illustrates more specific examples of various numerical values of the zoom lens according to Example 4. FIG. 11A is an aberration diagram of the zoom lens at the wide-angle end, FIG. 11B is an aberration diagram of the zoom lens at the middle zoom position, and FIG. 12 is an aberration diagram of the zoom lens at the telephoto end in Example 4 (numerical example 4).

Table 1 summarizes the values of the above conditions (inequalities (1) to (6)) in Example 4 (numerical example 4).

As understood from Table 1, the zoom lens according to numerical example 4 satisfies each condition.

Example 5

Figure 13:
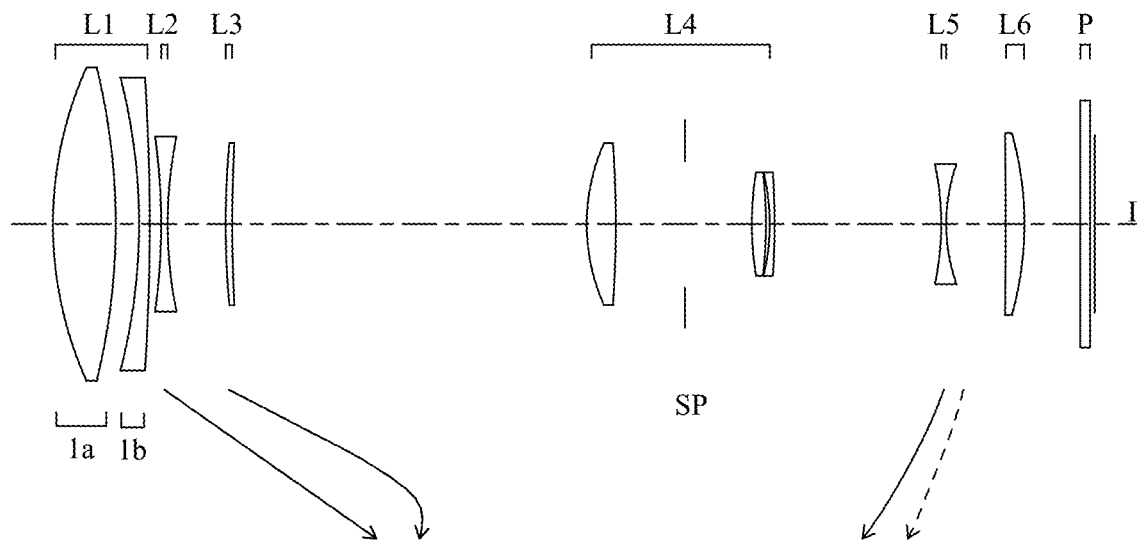
FIG. 13 is a sectional view of a zoom lens according to Example 5.

The zoom lens according to Example 5 illustrated in FIG. 13 includes, in order from the object side to the image side, a first lens unit L1 having a positive refractive power, a second lens unit L2 having a negative refractive power, and a subsequent unit that includes a third lens unit L3 having a positive refractive power, a fourth lens unit L4 having a positive refractive power, a fifth lens unit L5 having a negative refractive power, and a sixth lens unit L6 having a positive refractive power. As illustrated by arrows in FIG. 13, during zooming from the wide-angle end to the telephoto end, the first lens unit L1 is fixed, and the second, third and fifth lens units L2, L3, and L5 are moved and change a distance between adjacent lens units. The fifth lens unit L5 is moved so as to draw a locus indicated by a solid arrow and a dotted arrow in in-focus states on an infinity object and a short-distance object, respectively. The fifth lens unit L5 is moved during focusing. The diaphragm SP is provided in the fourth lens unit L4.

Figure 14A:
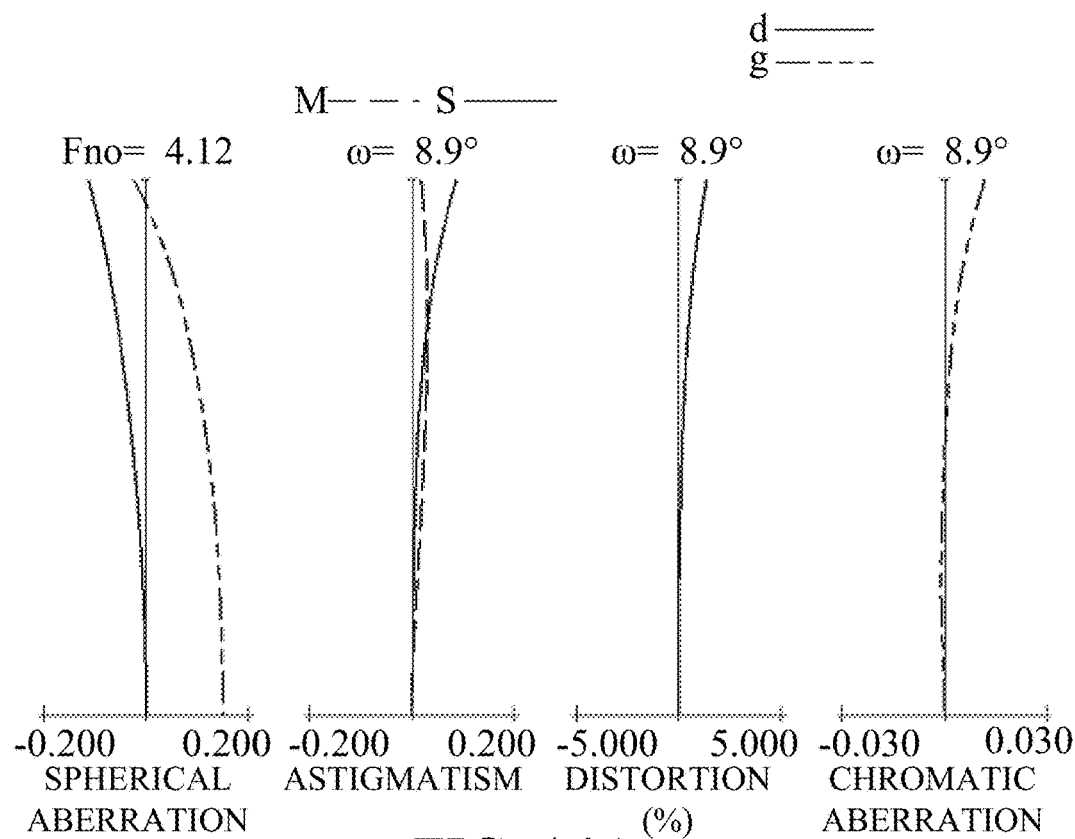
FIGS. 14A and 14B are aberration diagram of the zoom lens at a wide-angle end and a middle zoom position in Example 5, respectively.
Figure 14B:
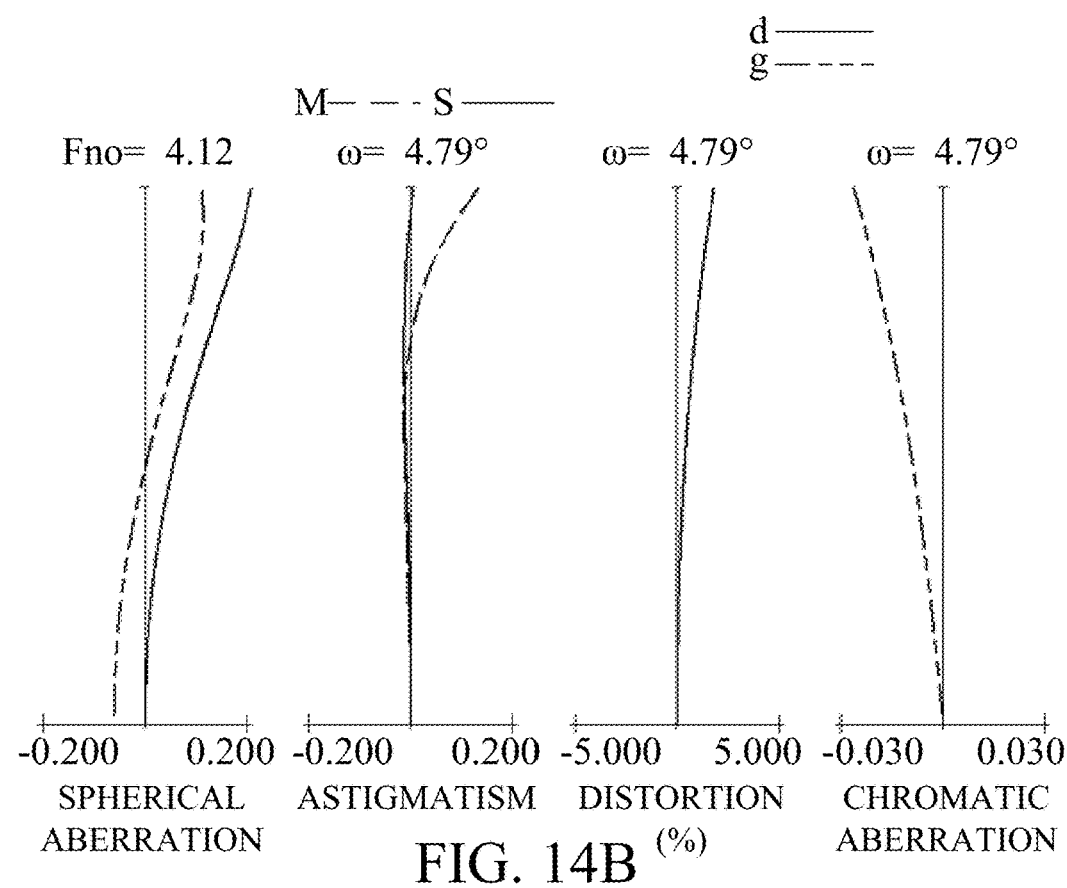
Figure 15:
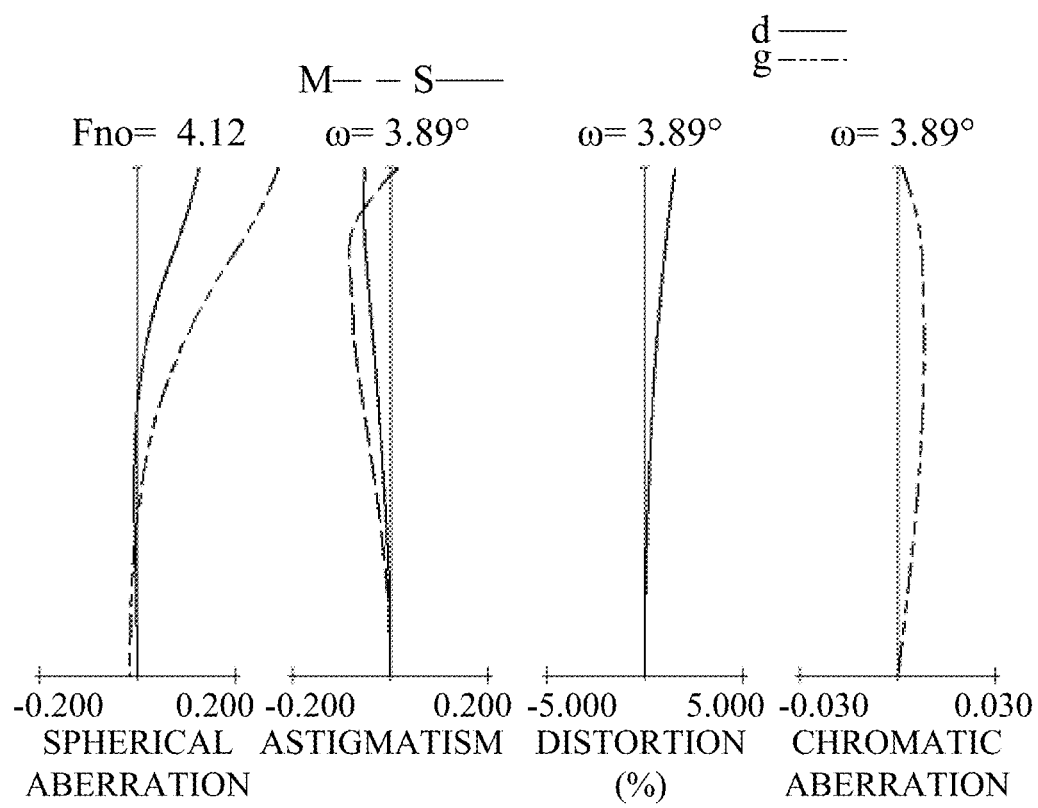
FIG. 15 is an aberration diagram at a telephoto end of the zoom lens according to Example 5.

Numerical example 5 illustrates more specific examples of various numerical values of the zoom lens according to Example 5. FIG. 14A is an aberration diagram of the zoom lens at the wide-angle end, FIG. 14B is an aberration diagram of the zoom lens at the middle zoom position, and FIG. 15 is an aberration diagram of the zoom lens at the telephoto end in Example 5 (numerical example 5).

Table 1 summarizes the values of the above conditions (inequalities (1) to (6)) in Example 5 (numerical example 5). As understood from Table 1, the zoom lens according to numerical example 5 satisfies each condition.

Example 6

Figure 16:
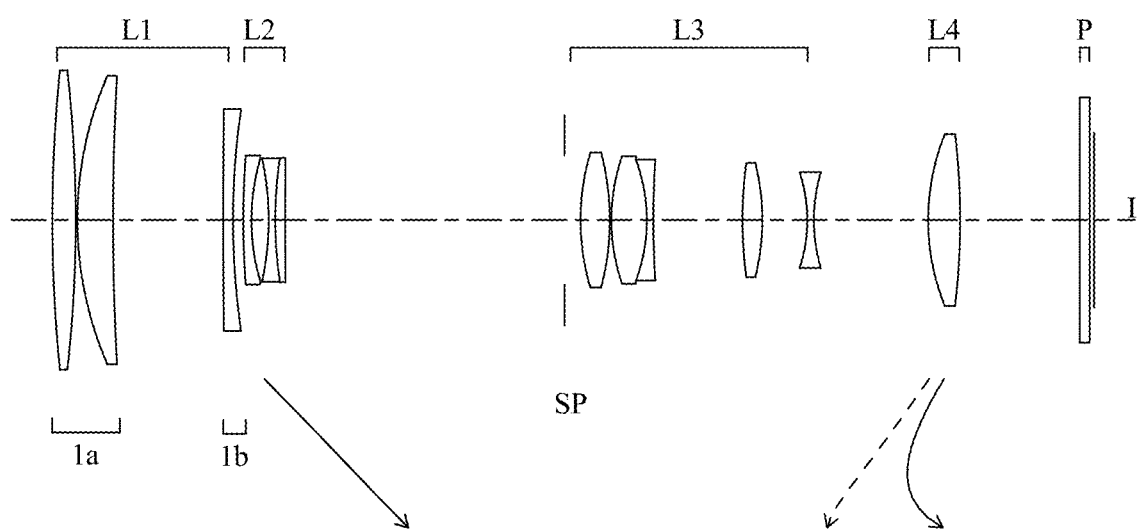
FIG. 16 is a sectional view of a zoom lens according to Example 6.

The zoom lenses according to Example 6 illustrated in FIG. 16 includes, in order from the object side to the image side, a first lens unit L1 having a positive refractive power, a second lens unit L2 having a negative refractive power, and a subsequent unit that includes a third lens unit L3 having a positive refractive power and a fourth lens unit L4 having a positive refractive power. As illustrated by arrows in FIG. 16, during zooming from the wide-angle end to the telephoto end, the first lens unit L1 is fixed, and the second and fourth lens units L2 and L4 are moved and change a distance between adjacent lens units. The fourth lens unit L4 is moved so as to draw a locus indicated by a solid arrow and a dotted arrow in in-focus states on an infinity object and a short-distance object, respectively. The fourth lens unit L4 is moved during focusing. The diaphragm SP is closest to the object in the third lens unit L3.

Figure 17A:
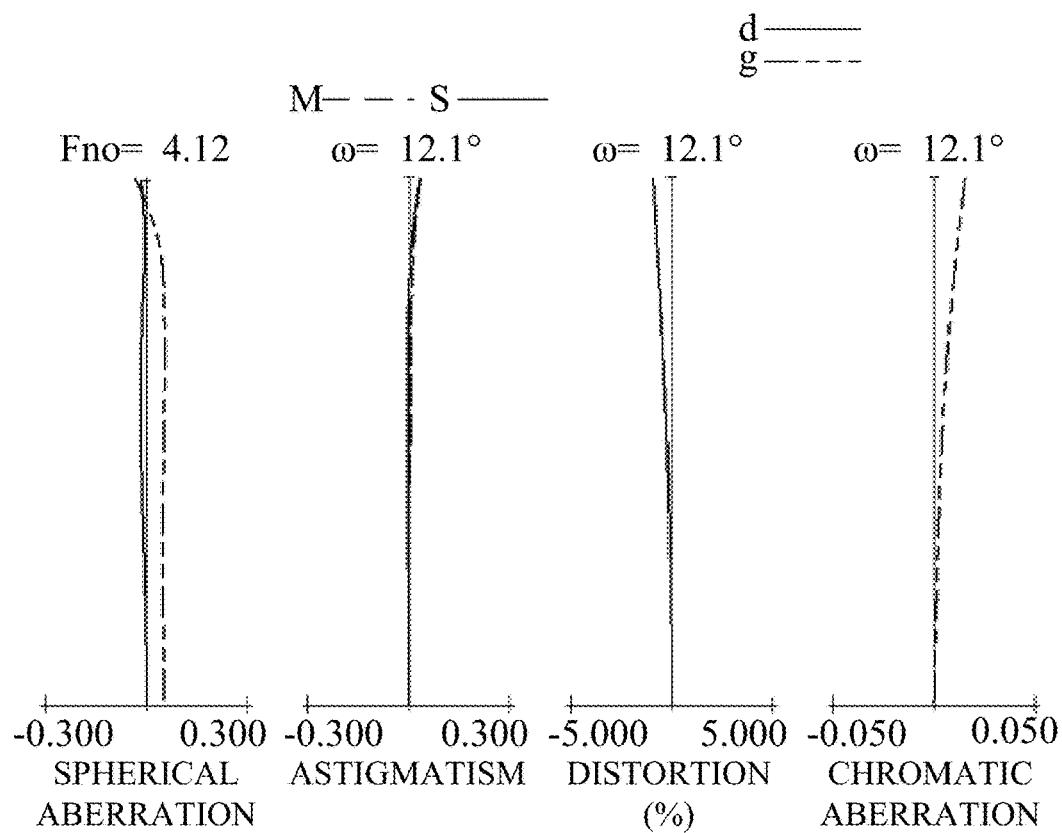
FIGS. 17A and 17B are aberration diagram of the zoom lens at a wide-angle end and a middle zoom position in Example 6, respectively.
Figure 17B:
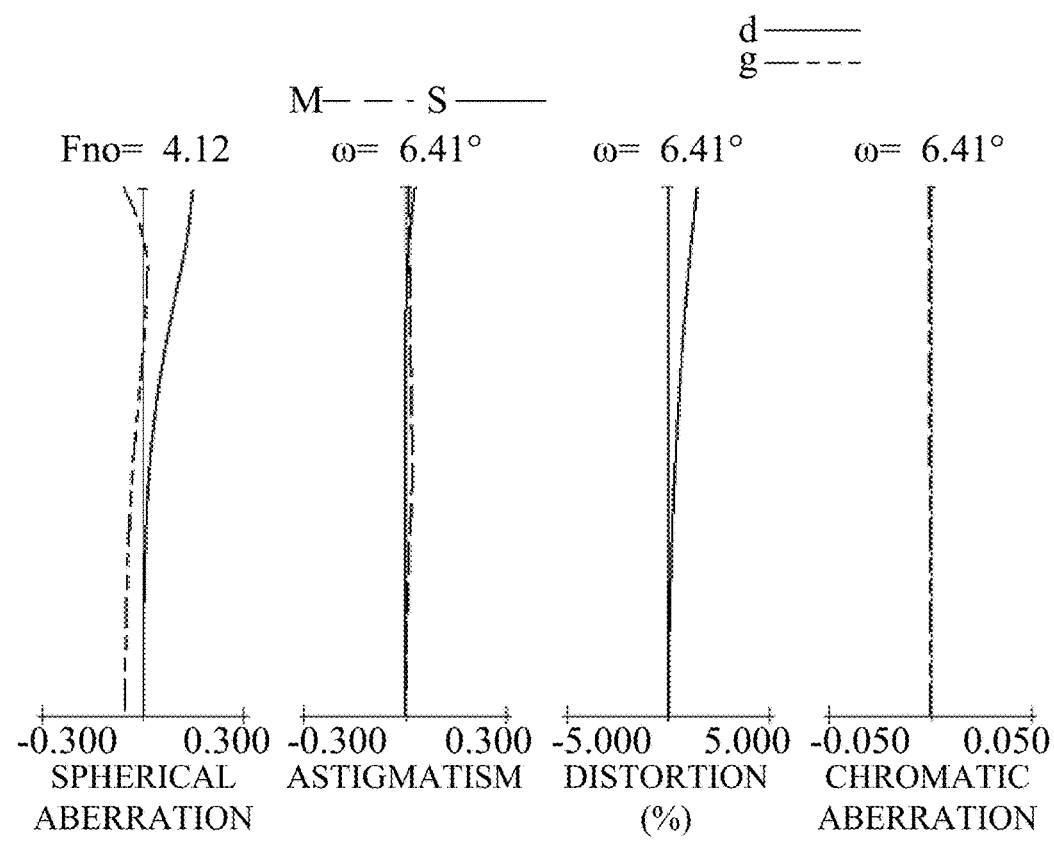
Figure 18:
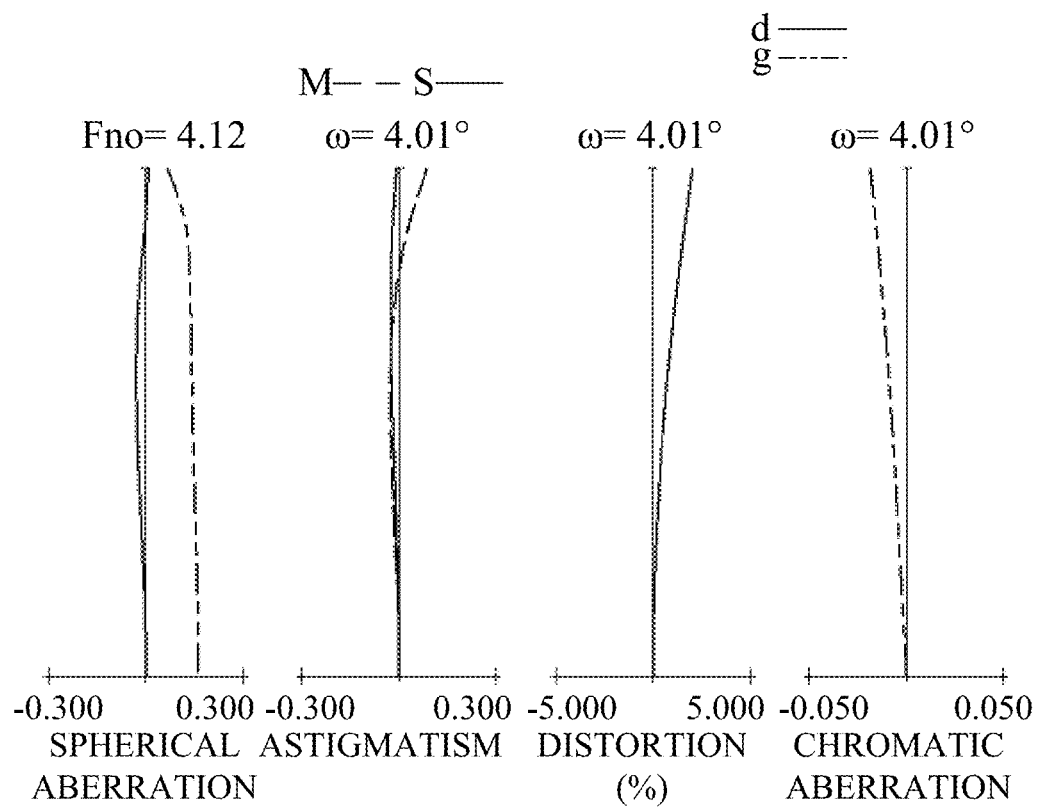
FIG. 18 is an aberration diagram at a telephoto end of the zoom lens according to Example 6.

Numerical example 6 illustrates more specific examples of various numerical values of the zoom lens according to Example 6. FIG. 17A is an aberration diagram of the zoom lens at the wide-angle end, FIG. 17B is an aberration diagram of the zoom lens at the middle zoom position, and FIG. 18 is an aberration diagram of the zoom lens at the telephoto end in Example 6 (numerical example 6). Table 1 summarizes the values of the above conditions (inequalities (1) to (6)) in Example 6 (numerical example 6). As understood from Table 1, the zoom lens according to numerical example 6 satisfies each condition.

Numerical Example 1

UNIT: mm

Surface Data

| Surface No. | r | d | nd | vd |
|---|---|---|---|---|
| 1 | 143.242 | 4.00 | 1.49700 | 81.6 |
| 2 | -143.242 | 0.20 | | |
| 3 | 43.357 | 4.50 | 1.49700 | 81.6 |
| 4 | 202.735 | 10.42 | | |
| 5 | 572.578 | 1.20 | 1.76182 | 26.5 |
| 6 | 79.390 | (VARIABLE) | | |
| 7 | 62.416 | 0.80 | 1.51680 | 64.2 |
| 8 | 26.127 | 2.25 | | |
| 9 | -37.802 | 0.70 | 1.83481 | 42.7 |
| 10 | 37.230 | 1.50 | 1.94594 | 18.0 |
| 11 | 224.375 | (VARIABLE) | | |
| 12 (Diaphragm) | ∞ | 0.75 | | |
| 13 | 43.472 | 3.30 | 1.69680 | 55.5 |
| 14 | -58.067 | 0.20 | | |
| 15 | 21.339 | 5.80 | 1.62041 | 60.3 |
| 16 | -43.365 | 0.80 | 1.92286 | 18.9 |
| 17 | 47.508 | 3.75 | | |
| 18 | 30.401 | 4.70 | 1.92286 | 18.9 |
| 19 | -22.570 | 0.70 | 1.90366 | 31.3 |
| 20 | 14.836 | (VARIABLE) | | |
| 21 | 33.444 | 2.70 | 1.48749 | 70.2 |
| 22 | ∞ | (VARIABLE) | | |
| 23 | ∞ | 1.20 | 1.51633 | 64.1 |
| 24 | ∞ | 1.00 | | |
| Image Plane | ∞ | | | |

VARIOUS DATA
ZOOM RATIO 2.99

| | WIDE-ANGLE | MIDDLE | TELEPHOTO |
|---|---|---|---|
| Focal Length: | 49.29 | 88.26 | 147.49 |
| Fno: | 4.12 | 4.12 | 4.12 |
| Half Angle of View (°): | 12.40 | 6.82 | 4.05 |
| Image Height: | 10.72 | 10.72 | 10.72 |
| Overall length: | 127.94 | 127.94 | 127.94 |
| BF: | 26.99 | 32.82 | 19.06 |
| d 6 | 1.99 | 19.31 | 33.49 |
| d11 | 34.58 | 17.26 | 3.08 |
| d20 | 16.10 | 10.27 | 24.03 |
| d22 | 25.20 | 31.03 | 17.27 |

Zoom Lens Unit Data

| Lens Unit | Starting Surface | Focal Length |
|---|---|---|
| 1 | 1 | 102.89 |
| 2 | 7 | -28.29 |
| 3 | 12 | 36.99 |
| 4 | 21 | 68.60 |
| 5 | 23 | ∞ |

Numerical Example 2

UNIT: mm

Surface Data

| Surface No. | r | d | nd | vd |
|---|---|---|---|---|
| 1 | 187.144 | 3.10 | 1.49700 | 81.6 |
| 2 | -187.144 | 0.20 | | |
| 3 | 37.843 | 5.37 | 1.59522 | 67.7 |
| 4 | 224.478 | 12.32 | | |
| 5 | -5366.802 | 1.20 | 2.00100 | 29.1 |
| 6 | 61.733 | (VARIABLE) | | |
| 7 | -182.674 | 0.70 | 1.88300 | 40.8 |
| 8 | 19.525 | 1.77 | 1.94594 | 18.0 |
| 9 | 40.864 | (VARIABLE) | | |
| 10 | 33.896 | 3.93 | 1.62299 | 58.2 |
| 11 | -50.266 | 0.20 | | |
| 12 | 38.215 | 3.90 | 1.59522 | 67.7 |
| 13 | -33.355 | 0.80 | 2.00069 | 25.5 |
| 14 | 520.525 | 0.71 | | |
| 15 (Diaphragm) | ∞ | (VARIABLE) | | |
| 16 | -33.703 | 0.70 | 1.59282 | 68.6 |
| 17 | 18.434 | (VARIABLE) | | |
| 18 | 56.450 | 4.14 | 1.95375 | 32.3 |
| 19 | -55.914 | (VARIABLE) | | |
| 20 | ∞ | 1.20 | 1.51633 | 64.1 |
| 21 | ∞ | 1.00 | | |
| Image Plane | ∞ | | | |

VARIOUS DATA
ZOOM RATIO 2.62

| | WIDE-ANGLE | MIDDLE | TELEPHOTO |
|---|---|---|---|
| Focal Length: | 66.00 | 109.71 | 173.00 |
| Fno: | 4.12 | 4.84 | 4.84 |
| Half Angle of View (°): | 9.13 | 5.46 | 3.44 |
| Image Height: | 10.72 | 10.72 | 10.72 |
| Overall length: | 127.94 | 127.94 | 127.94 |
| BF: | 20.98 | 14.91 | 9.94 |
| d 6 | 1.66 | 19.08 | 33.33 |
| d 9 | 34.58 | 17.16 | 2.91 |
| d15 | 19.12 | 21.46 | 19.82 |
| d17 | 12.57 | 16.30 | 22.90 |
| d19 | 19.19 | 13.12 | 8.15 |

Zoom Lens Unit Data

| Lens Unit | Starting Surface | Focal Length |
|---|---|---|
| 1 | 1 | 137.96 |
| 2 | 7 | -40.28 |
| 3 | 10 | 30.10 |
| 4 | 16 | -20.00 |
| 5 | 18 | 29.99 |
| 6 | 20 | ∞ |

Numerical Example 3

UNIT: mm

Surface Data

| Surface No. | r | d | nd | vd |
|---|---|---|---|---|
| 1 | 133.782 | 4.13 | 1.49700 | 81.6 |
| 2 | -133.782 | 0.20 | | |
| 3 | 35.717 | 5.68 | 1.49700 | 81.6 |
| 4 | 201.019 | 9.86 | | |
| 5 | 11281.738 | 1.20 | 1.74950 | 35.3 |
| 6 | 56.450 | (VARIABLE) | | |
| 7 | -74.976 | 0.70 | 1.95375 | 32.3 |
| 8 | 18.809 | 1.60 | 1.94594 | 18.0 |
| 9 | 51.428 | (VARIABLE) | | |
| 10 (Diaphragm) | ∞ | 0.65 | | |
| 11 | 18.732 | 4.48 | 1.63854 | 55.4 |
| 12 | -41.720 | 0.20 | | |
| 13 | 40.386 | 5.67 | 1.59282 | 68.6 |
| 14 | -16.362 | 0.80 | 2.00330 | 28.3 |
| 15 | -1420.006 | (VARIABLE) | | |
| 16 | -31.427 | 0.70 | 1.53775 | 74.7 |
| 17 | 15.859 | (VARIABLE) | | |

-continued

| UNIT: mm | | | | |
|---|---|---|---|---|
| 18 | 45.758 | 3.47 | 1.74950 | 35.3 |
| 19 | −104.537 | (VARIABLE) | | |
| 20 | ∞ | 1.20 | 1.51633 | 64.1 |
| 21 | ∞ | 1.00 | | |
| Image Plane | ∞ | | | |

| VARIOUS DATA ZOOM RATIO 2.14 | | | |
|---|---|---|---|
| | WIDE-ANGLE | MIDDLE | TELEPHOTO |
| Focal Length: | 70.00 | 105.54 | 150.00 |
| Fno: | 4.12 | 4.84 | 4.84 |
| Half Angle of View: (°) | 8.81 | 5.82 | 4.07 |
| Image Height: | 10.72 | 10.72 | 10.72 |
| Overall length: | 127.94 | 127.94 | 127.94 |
| BF: | 42.23 | 38.61 | 24.73 |
| d 6 | 5.12 | 18.76 | 29.91 |
| d 9 | 27.70 | 14.07 | 2.91 |
| d15 | 2.91 | 3.43 | 3.86 |
| d17 | 10.66 | 13.75 | 27.20 |
| d19 | 40.43 | 36.82 | 22.94 |

| Zoom Lens Unit Data | | |
|---|---|---|
| Lens Unit | Starting Surface | Focal Length |
| 1 | 1 | 104.85 |
| 2 | 7 | −31.43 |
| 3 | 10 | 22.44 |
| 4 | 16 | −19.50 |
| 5 | 18 | 42.89 |
| 6 | 20 | ∞ |

Numerical Example 4

| UNIT: mm | | | | |
|---|---|---|---|---|
| Surface Data | | | | |
| Surface No. | r | d | nd | νd |
| 1 | 173.951 | 3.29 | 1.49700 | 81.6 |
| 2 | −173.951 | 0.20 | | |
| 3 | 36.009 | 1.20 | 1.76182 | 26.5 |
| 4 | 31.126 | 6.59 | 1.49700 | 81.6 |
| 5 | 164.821 | 22.99 | | |
| 6 | −369.147 | 1.20 | 1.69895 | 30.1 |
| 7 | 49.265 | (VARIABLE) | | |
| 8 | 28.138 | 0.80 | 1.51680 | 64.2 |
| 9 | 24.125 | 1.79 | | |
| 10 | −33.276 | 0.70 | 1.83481 | 42.7 |
| 11 | 21.542 | 1.39 | 1.94594 | 18.0 |
| 12 | 61.963 | (VARIABLE) | | |
| 13 (Diaphragm) | ∞ | 0.68 | | |
| 14 | 41.273 | 3.99 | 1.69680 | 55.5 |
| 15 | −36.994 | 0.19 | | |
| 16 | 31.334 | 3.59 | 1.62041 | 60.3 |
| 17 | −23.866 | 0.80 | 1.92286 | 18.9 |
| 18 | 337.121 | 4.00 | | |
| 19 | 29.813 | 2.47 | 1.92286 | 18.9 |
| 20 | −23.865 | 0.70 | 1.90366 | 31.3 |
| 21 | 17.305 | (VARIABLE) | | |
| 22 | −55.688 | 2.70 | 1.48749 | 70.2 |
| 23 | −27.644 | (VARIABLE) | | |
| 24 | ∞ | 1.20 | 1.51633 | 64.1 |
| 25 | ∞ | 1.00 | | |
| Image Plane | ∞ | | | |

-continued

| UNIT: mm | | | |
|---|---|---|---|
| VARIOUS DATA ZOOM RATIO 1.56 | | | |
| | WIDE-ANGLE | MIDDLE | TELEPHOTO |
| Focal Length: | 94.36 | 118.27 | 147.42 |
| Fno: | 4.12 | 4.63 | 4.64 |
| Half Angle of View (°): | 6.46 | 5.08 | 4.06 |
| Image Height: | 10.72 | 10.72 | 10.72 |
| Overall length: | 127.95 | 127.95 | 127.95 |
| BF: | 19.0 | 30.36 | 34.48 |
| d 7 | 1.60 | 8.78 | 14.65 |
| d12 | 16.56 | 9.38 | 3.51 |
| d21 | 31.50 | 20.15 | 16.03 |
| d23 | 17.22 | 28.57 | 32.69 |

| Zoom Lens Unit Data | | |
|---|---|---|
| Lens Unit | Starting Surface | Focal Length |
| 1 | 1 | 136.91 |
| 2 | 8 | −26.15 |
| 3 | 13 | 30.37 |
| 4 | 22 | 109.16 |
| 5 | 24 | ∞ |

Numerical Example 5

| UNIT: mm | | | | |
|---|---|---|---|---|
| Surface Data | | | | |
| Surface No. | r | d | nd | νd |
| 1 | 46.858 | 7.63 | 1.49700 | 81.5 |
| 2 | −79.530 | 2.83 | | |
| 3 | −71.562 | 1.30 | 1.88300 | 40.8 |
| 4 | −274.316 | (VARIABLE) | | |
| 5 | −77.084 | 0.80 | 1.57099 | 50.8 |
| 6 | 53.024 | (VARIABLE) | | |
| 7 | 107.810 | 0.81 | 1.95906 | 17.5 |
| 8 | 193.512 | (VARIABLE) | | |
| 9 | 24.269 | 3.53 | 1.48749 | 70.2 |
| 10 | −141.966 | 8.43 | | |
| 11 (Diaphragm) | ∞ | 8.12 | | |
| 12 | 39.009 | 1.71 | 1.53775 | 74.7 |
| 13 | −57.992 | 0.46 | | |
| 14 | −26.465 | 0.60 | 1.96300 | 24.1 |
| 15 | −98.143 | (VARIABLE) | | |
| 16 | −34.480 | 0.59 | 1.49700 | 81.5 |
| 17 | 21.934 | (VARIABLE) | | |
| 18 | −706.480 | 2.28 | 1.92286 | 18.9 |
| 19 | −40.776 | 6.78 | | |
| 20 | ∞ | 1.20 | 1.51633 | 64.1 |
| 21 | ∞ | 1.00 | | |
| Image Plane | ∞ | | | |

| VARIOUS DATA ZOOM RATIO 2.30 | | | |
|---|---|---|---|
| | WIDE-ANGLE | MIDDLE | TELEPHOTO |
| Focal Length: | 68.17 | 126.83 | 156.80 |
| Fno: | 4.12 | 4.12 | 4.12 |
| Half Angle of View (°): | 8.90 | 4.79 | 3.89 |
| Image Height: | 10.82 | 10.82 | 10.82 |
| Overall length: | 126.65 | 126.65 | 126.65 |
| BF: | 8.57 | 8.57 | 8.57 |
| d 4 | 1.38 | 36.37 | 48.03 |
| d 6 | 7.04 | 13.55 | 2.32 |
| d 8 | 43.09 | 1.59 | 1.15 |
| d15 | 20.26 | 8.08 | 2.42 |
| d17 | 7.23 | 19.41 | 25.06 |

-continued

UNIT: mm

Zoom Lens Unit Data

| Lens Unit | Starting Surface | Focal Length |
|---|---|---|
| 1 | 1 | 120.40 |
| 2 | 5 | −54.90 |
| 3 | 7 | 252.65 |
| 4 | 9 | 44.73 |
| 5 | 16 | −26.88 |
| 6 | 18 | 46.81 |
| 7 | 20 | ∞ |

Numerical Example 6

UNIT: mm

Surface Data

| Surface No. | r | d | nd | vd |
|---|---|---|---|---|
| 1 | 183.897 | 2.86 | 1.49700 | 81.5 |
| 2 | −164.756 | 0.20 | | |
| 3 | 44.535 | 4.37 | 1.49700 | 81.5 |
| 4 | 327.457 | 13.50 | | |
| 5 | 1448.057 | 1.20 | 1.85478 | 24.8 |
| 6 | 95.116 | (VARIABLE) | | |
| 7 | 109.040 | 1.00 | 1.49700 | 81.5 |
| 8 | 26.580 | 2.12 | | |
| 9 | −35.010 | 0.80 | 1.83481 | 42.7 |
| 10 | 51.613 | 1.24 | 1.95906 | 17.5 |
| 11 | 4281.220 | (VARIABLE) | | |
| 12 (Diaphragm) | ∞ | 1.99 | | |
| 13 | 29.085 | 3.58 | 1.49700 | 81.5 |
| 14 | −32.787 | 0.19 | | |
| 15 | 24.189 | 4.34 | 1.48749 | 70.2 |
| 16 | −21.298 | 0.80 | 1.90366 | 31.3 |
| 17 | 113.532 | 10.91 | | |
| 18 | 51.154 | 2.43 | 1.72825 | 28.5 |
| 19 | −29.228 | 5.52 | | |
| 20 | −18.460 | 0.80 | 1.77250 | 49.6 |
| 21 | 20.506 | (VARIABLE) | | |
| 22 | 28.397 | 3.91 | 1.49700 | 81.5 |
| 23 | −89.540 | (VARIABLE) | | |
| 24 | ∞ | 1.20 | 1.51633 | 64.1 |
| 25 | ∞ | 1.00 | | |
| Image Plane | ∞ | | | |

VARIOUS DATA
ZOOM RATIO 2.98

| | WIDE-ANGLE | MIDDLE | TELEPHOTO |
|---|---|---|---|
| Focal Length: | 50.36 | 94.13 | 150.00 |
| Fno: | 4.12 | 4.12 | 4.12 |
| Half Angle of View (°): | 12.10 | 6.41 | 4.01 |
| Image Height: | 10.72 | 10.72 | 10.72 |
| Overall length: | 127.60 | 127.60 | 127.60 |
| BF: | 16.44 | 24.52 | 16.75 |
| d 6 | 1.25 | 20.25 | 32.91 |
| d11 | 34.16 | 15.16 | 2.50 |
| d21 | 14.00 | 5.92 | 13.69 |
| d23 | 14.65 | 22.73 | 14.96 |

Zoom Lens Unit Data

| Lens Unit | Starting Surface | Focal Length |
|---|---|---|
| 1 | 1 | 108.00 |
| 2 | 7 | −27.55 |
| 3 | 12 | 30.04 |
| 4 | 22 | 43.86 |
| 5 | 24 | ∞ |

TABLE 1

| | (NUMERICAL) EXAMPLE | | | | | |
|---|---|---|---|---|---|---|
| Inequ. | Ex. 1 | Ex. 2 | Ex. 3 | Ex. 4 | Ex. 5 | Ex. 6 |
| (1) | 0.70 | 0.80 | 0.70 | 0.93 | 0.77 | 0.72 |
| (2) | 0.86 | 0.74 | 0.85 | 0.86 | 0.80 | 0.85 |
| (3) | 1.64 | 2.55 | 1.98 | 2.15 | 1.99 | 1.66 |
| (4) | 4.28 | 1.51 | 2.41 | 2.37 | 2.00 | 4.32 |
| (5) | 0.20 | 0.16 | 0.20 | 0.26 | 0.10 | 0.20 |
| (6) | 26.5 | 29.1 | 35.3 | 28.3 | 40.8 | 24.8 |

Figure 19:
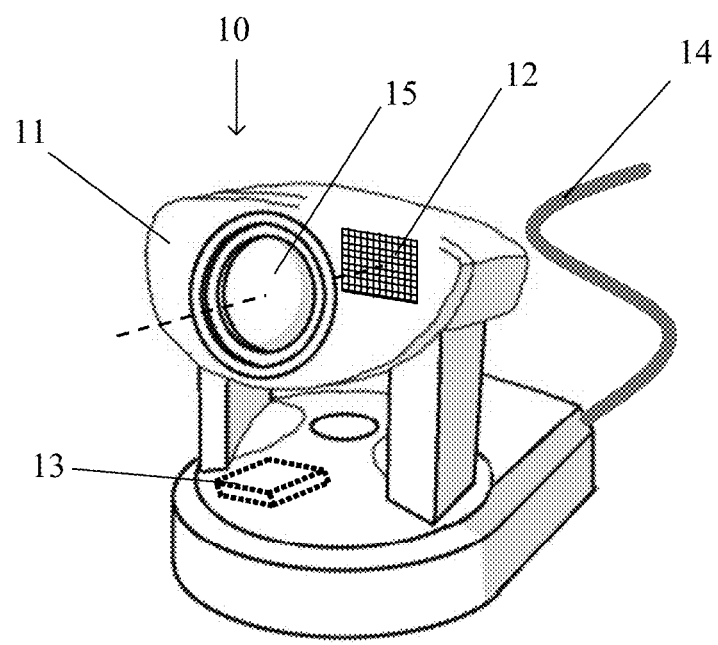
FIG. 19 illustrates a surveillance camera using the zoom lens according to each example.

FIG. 19 illustrates an image pickup apparatus (surveillance camera) 10 that includes the zoom lens according to any one of Examples 1 to 6. Reference numeral 11 denotes a camera body, and reference numeral 12 denotes an image sensor (image pickup element) built in the camera body 11 and receiving (picking up; imaging) an object image formed by a zoom lens 15 as an imaging optical system. The image data generated by using an imaging signal from the image sensor 12 is recorded in a memory 13 or output to the outside (network or the like) via a cable 14. An electric signal instructing the operation of the image pickup apparatus may be received via the cable 14. The generated image data may receive electronic aberration correction processing and may be recorded or output as higher quality image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the number of lenses constituting each lens unit may be changed, or the shape of each lens may be changed (for example, by providing an aspherical surface). Any lens unit or lens may be moved in a direction orthogonal to the optical axis to reduce (correct) image shakes caused by the vibration such as the camera shake.

According to the above embodiment, for example, it is possible to provide a zoom lens that is advantageous in terms of miniaturization and high optical performance in the entire zoom range.

This application claims the benefit of Japanese Patent Application No. 2021-016051, filed on Feb. 3, 2021, which is hereby incorporated by reference herein in its entirety.

What is claimed is:

1. A zoom lens comprising, in order from an object side to an image side:
   a first lens unit having a positive refractive power;
   a second lens unit having a negative refractive power; and
   a subsequent unit,
   wherein the first lens unit is configured not to move for zooming,
   wherein a distance between each pair of adjacent lens units changes in zooming,
   wherein the first lens unit includes a first subunit having a positive refractive power on the object side of an air spacing that is largest in the first lens unit, and a second subunit having a negative refractive power on the image side of the air spacing, and
   wherein the following conditions are satisfied:

$$0.68 \leq f1/ft \leq 1.20,$$

$$0.27 \leq TDt/ft \leq 0.90,$$

$1.20 \leq f1/f1a \leq 2.60$, and $0.01 \leq D1/f1 \leq 0.30$, where f1 is a focal length of the first lens unit, ft is a focal length of the zoom lens at a telephoto end, TDt is a length on an optical axis of the zoom lens from a surface closest to the object side to a surface closest to the image side at the telephoto end, f1a is a focal length of the first subunit, and D1 is a length on the optical axis from a surface closest to the object side to a surface closest to the image side of the first lens unit.

2. The zoom lens according to claim 1, wherein the following condition is satisfied:

$0.90 \leq f1b/f2 \leq 6.50$ where f1b is a focal length of the second subunit, and f2 is a focal length of the second lens unit.

3. The zoom lens according to claim 1, wherein the first lens unit consists of at most four lenses.

4. The zoom lens according to claim 1, wherein the first lens unit includes a lens closest to the object side and having a positive refractive power, and a lens closest to the image side and having a negative refractive power.

5. The zoom lens according to claim 1, wherein the following condition is satisfied:

$15.0 \leq \nu1nave \leq 60.0$ where ν1nave is an average Abbe number of at least one negative lens in the first lens unit.

6. The zoom lens according to claim 1, wherein the subsequent unit includes at least one lens unit configured not to move in zooming, and wherein at least one of the at least one lens unit includes at least three lenses.

7. The zoom lens according to claim 1, wherein a lens unit on the image side of the second lens unit is configured to move for focusing.

8. The zoom lens according to claim 1, wherein the subsequent unit includes, in order from the object side to the image side, a third lens unit having a positive refractive power, and a fourth lens unit having a positive refractive power.

9. The zoom lens according to claim 1, wherein the subsequent unit includes, in order from the object side to the image side, a third lens unit having a positive refractive power, a fourth lens unit having a negative refractive power, and a fifth lens unit having a positive refractive power.

10. The zoom lens according to claim 1, wherein the subsequent unit includes, in order from the object side to the image side, a third lens unit having a positive refractive power, a fourth lens unit having a positive refractive power, a fifth lens unit having a negative refractive power, and a sixth lens unit having a positive refractive power.

11. An image pickup apparatus comprising:
a zoom lens; and
an image pickup element configured to pick up an image formed by the zoom lens,
wherein the zoom lens includes, in order from an object side to an image side:
a first lens unit having a positive refractive power,
a second lens unit having a negative refractive power, and
a subsequent unit,
wherein the first lens unit is configured not to move in zooming,
wherein a distance between each pair of adjacent lens units changes in zooming,
wherein the first lens unit includes a first subunit having a positive refractive power on the object side of an air spacing that is largest in the first lens unit, and a second subunit having a negative refractive power on the image side of the air spacing, and
wherein the following conditions are satisfied:

$0.68 \leq f1/ft \leq 1.20$, $0.27 \leq TDt/ft \leq 0.90$, $1.20 \leq f1/f1a \leq 2.60$, and $0.01 \leq D1/f1 \leq 0.30$, where f1 is a focal length of the first lens unit, ft is a focal length of the zoom lens at a telephoto end, TDt is a length on an optical axis of the zoom lens from a surface closest to the object side to a surface closest to an image side at the telephoto end, f1a is a focal length of the first subunit, and D1 is a length on the optical axis from a surface closest to the object side to a surface closest to the image side of the first lens unit.

12. A zoom lens comprising, in order from an object side to an image side:
a first lens unit having a positive refractive power;
a second lens unit having a negative refractive power; and
a subsequent unit,
wherein the first lens unit is configured not to move for zooming,
wherein a distance between each pair of adjacent lens units changes in zooming,
wherein the first lens unit includes a first subunit having a positive refractive power on the object side of an air spacing that is largest in the first lens unit, and a second subunit having a negative refractive power on the image side of the air spacing, and
wherein the following conditions are satisfied:

$0.68 \leq f1/ft \leq 1.20$, $0.27 \leq TDt/ft \leq 0.90$, $1.20 \leq f1b/f2 \leq 6.50$, and $0.01 \leq D1/f1 \leq 0.30$, where f1 is a focal length of the first lens unit, ft is a focal length of the zoom lens at a telephoto end, TDt is a length on an optical axis of the zoom lens from a surface closest to the object side to a surface closest to the image side at the telephoto end, f1b is a focal length of the second subunit, f2 is a focal length of the second lens unit, and D1 is a length on the optical axis from a surface closest to the object side to a surface closest to the image side of the first lens unit.

* * * * *